United States Patent
Kent

(10) Patent No.: US 11,260,321 B2
(45) Date of Patent: *Mar. 1, 2022

(54) PARTITIONED WATER TREATMENT SYSTEMS WITH VERTICAL FILTRATION UNITS

(71) Applicant: Bio Clean Environmental Services, Inc., Oceanside, CA (US)

(72) Inventor: Zachariha J. Kent, Fair Oaks Ranch, TX (US)

(73) Assignee: Bio Clean Environmental Services, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,212

(22) Filed: Jun. 3, 2019

(65) Prior Publication Data
US 2019/0282933 A1 Sep. 19, 2019

Related U.S. Application Data

(60) Division of application No. 15/442,466, filed on Feb. 24, 2017, now Pat. No. 10,307,696, which is a
(Continued)

(51) Int. Cl.
*B01D 21/00* (2006.01)
*E03F 5/16* (2006.01)
(Continued)

(52) U.S. Cl.
CPC ....... *B01D 21/0012* (2013.01); *B01D 21/003* (2013.01); *B01D 21/0033* (2013.01); *B01D 29/52* (2013.01); *C02F 1/004* (2013.01); *E03F 5/14* (2013.01); *E03F 5/16* (2013.01); *B01D 29/005* (2013.01); *C02F 2103/001* (2013.01); *C02F 2201/002* (2013.01); *C02F 2209/40* (2013.01)

(58) Field of Classification Search
CPC ........... B01D 21/0012; B01D 21/0033; B01D 21/003; B01D 29/52; B01D 29/005; E03F 5/16; E03F 5/14; C02F 1/004; C02F 2201/002; C02F 2103/001; C02F 2209/40
See application file for complete search history.

(56) References Cited

U.S. PATENT DOCUMENTS

| 2,468,862 | A | * | 5/1949 | Briggs | .................. B01D 27/02 |
| | | | | | 210/457 |
| 4,150,683 | A | | 4/1979 | Simon | |

(Continued)

OTHER PUBLICATIONS

Oldcastle Precast, Inc., "PerkFilter Media Filtration", Online Brochure available at https://oldcastleinfrastructure.com/brands/perkfilter/ (Retrieved Mar. 2, 2020), Sep. 28, 2015, 2 pages.
(Continued)

*Primary Examiner* — Liam Royce
(74) *Attorney, Agent, or Firm* — Steven W. Webb

(57) ABSTRACT

The present invention supplies partitioned water treatment systems that possess a plurality of chambers and vertical filtration units, and are operative to control and filter surface runoff water. Such systems are typically placed inline with surface runoff water conveyance system infrastructure, such as pipes, channels, and water storage units.

4 Claims, 23 Drawing Sheets

Related U.S. Application Data continuation of application No. 14/145,765, filed on Dec. 31, 2013, now Pat. No. 9,604,160.

(51) Int. Cl.
  *C02F 1/00* (2006.01)
  *E03F 5/14* (2006.01)
  *B01D 29/52* (2006.01)
  *B01D 29/00* (2006.01)
  *C02F 103/00* (2006.01)

(56) References Cited

U.S. PATENT DOCUMENTS

| | | | |
|---|---|---|---|
| 5,707,527 A | 1/1998 | Knutson et al. | |
| 5,820,762 A | 10/1998 | Barner et al. | |
| 6,217,757 B1 | 4/2001 | Fleischmann | |
| 6,524,473 B2 | 2/2003 | Williamson | |
| 6,998,038 B2 | 2/2006 | Howard | |
| 7,025,887 B1 * | 4/2006 | Kirts | B01D 21/003 |
| | | | 210/681 |
| 7,214,311 B2 | 5/2007 | Aberle et al. | |
| 7,494,585 B2 | 2/2009 | Nino | |
| 8,137,564 B2 | 3/2012 | Gannon | |
| 8,147,688 B2 | 4/2012 | Adams et al. | |
| 8,366,923 B1 * | 2/2013 | Happel | E03F 5/14 |
| | | | 210/170.03 |
| 8,491,797 B1 | 7/2013 | Happel | |
| 2003/0121846 A1 | 7/2003 | Use | |
| 2007/0068878 A1 | 3/2007 | Stever et al. | |
| 2008/0277326 A1 * | 11/2008 | Hersey | B01D 29/15 |
| | | | 210/170.03 |
| 2009/0255868 A1 | 10/2009 | Allen, II et al. | |
| 2011/0168612 A1 | 7/2011 | Happel | |
| 2011/0192773 A1 | 8/2011 | Kent | |
| 2013/0180903 A1 | 1/2013 | Kowalsky | |
| 2013/0228527 A1 | 8/2013 | Crasti | |
| 2014/0027362 A1 | 1/2014 | Kent | |
| 2014/0042120 A1 | 2/2014 | Allard | |

OTHER PUBLICATIONS

Contec Engineered Solutions, LLC, "The Stormwater Management StormFilter", Online Brochure available at: https://www.conteches.com/stormwater-management/treatment/stormwater-management-stormfilter (Retrieved Mar. 2, 2020), 2019, 6 pages.

* cited by examiner

PARTITIONED WATER TREATMENT SYSTEMS WITH VERTICAL FILTRATION UNITS

CROSS-REFERENCE TO RELATED APPLICATION(S)

This application is a continuation of U.S. patent application Ser. No. 15/442,466, filed Feb. 24, 2017, now U.S. Pat. No. 10,307,696, which is a division of U.S. patent application Ser. No. 14/145,765, filed Dec. 31, 2013, now U.S. Pat. No. 9,604,160 entitled "PARTITIONED WATER TREATMENT SYSTEMS WITH VERTICAL FILTRATION UNITS", which is incorporated herein by reference in its entirety as if set forth in full.

FIELD OF THE INVENTION

The invention relates to the fields of water filtration systems and surface runoff water conveyance systems.

BACKGROUND OF THE INVENTION

Water treatment systems have been in existence for many years. These systems treat stormwater surface runoff or other polluted water. Stormwater runoff is of concern for two main reasons: i. volume and flow rate, and ii. pollution and contamination. The volume and flow rate of stormwater runoff is a concern because large volumes and high flow rates can cause erosion and flooding. Pollution and contamination of stormwater runoff is a concern because stormwater runoff flows into our rivers, streams, lakes, wetlands, and/or oceans. Pollution and contamination carried by stormwater runoff into such bodies of water can have significant adverse effects on the health of ecosystems.

The Clean Water Act of 1972 enacted laws to improve water infrastructure and quality. Sources of water pollution have been divided into two categories: point source and non-point source. Point sources include wastewater and industrial waste. Point sources are readily identifiable, and direct measures can be taken to mitigate them. Non-point sources are more difficult to identify. Stormwater runoff is the major contributor to non-point source pollution. Studies have revealed that contaminated stormwater runoff is the leading cause of pollution to our waterways. As we build houses, buildings, parking lots, roads, and other impervious areas, we increase the amount of water that runs into our stormwater conveyance systems and eventually flows into rivers, lakes, streams, wetlands, and/or oceans. As more land becomes impervious, less rain seeps into the ground, resulting in less groundwater recharge and higher velocity flows, which cause erosion and increased pollution levels of watery environments.

Numerous sources introduce pollutants into stormwater runoff. Sediments from hillsides and other natural areas exposed during construction and other human activities are one source of such pollutants. When land is stripped of vegetation, stormwater runoff erodes the exposed land and carries it into storm drains. Trash and other debris dropped on the ground are also carried into storm drains by stormwater runoff. Another source of pollutants is leaves and grass clippings from landscaping activities that accumulate on hardscape areas and do not decompose back into the ground, but flow into storm drains and collect in huge amounts in lakes and streams. These organic substances leach out large amounts of nutrients as they decompose and cause large algae blooms, which deplete dissolved oxygen levels in marine environments and result in expansive marine dead zones. Unnatural stormwater polluting nutrients include nitrogen, phosphorus, and ammonia that come from residential and agricultural fertilizers.

Heavy metals that come from numerous sources are harmful to fish, wildlife, and humans. Many of our waterways are no longer safe for swimming or fishing due to heavy metals introduced by stormwater runoff. Heavy metals include zinc, copper, lead, mercury, cadmium and selenium. These metals come from vehicle tires and brake pads, paints, galvanized roofs and fences, industrial activities, mining, recycling centers, etc. Hydrocarbons are also of concern and include oils, gas, and grease. These pollutants come from leaky vehicles and other heavy equipment that use hydraulic fluid, brake fluid, diesel, gasoline, motor oil, and other hydrocarbon based fluids. Bacteria and pesticides are additional harmful pollutants carried into waterways by stormwater runoff Over the last 20 years, the Environmental Protection Agency (EPA) has been monitoring the pollutant concentrations in most streams, rivers, and lakes in the United States. Over 50% of waterways in the United States are impaired by one of more of the above-mentioned pollutants. As part of the EPA Phase 1 and Phase 2 National Pollutant Discharge Elimination Systems, permitting requirements intended to control industrial and nonindustrial development activities have been implemented. Phase 1 was initiated in 1997 and Phase 2 was initiated in 2003. While there are many requirements for these permits, the main requirements focus on pollution source control, pollution control during construction, and post construction pollution control. Post construction control mandates that any new land development or redevelopment activities incorporate methods and solutions that both control increased flows of surface water runoff from the site and decrease (filter out) the concentration of pollutants off the site. These requirements are commonly known as quantity and quality control. Another part of these requirements is for existing publicly owned developed areas to retrofit the existing drainage infrastructure with quality and quantity control methods and technologies that decrease the amount of surface water runoff and pollutant concentrations therein.

A major category of technologies used to meet these requirements are referred to as structural best management practices (BMPs). Structural BMPs include proprietary and non-proprietary technologies designed to store and/or remove pollutants from stormwater. Technologies such as detention ponds and regional wetlands are used to control the volume of surface water runoff while providing some pollutant reduction capabilities. Various rain water runoff treatment technologies such as catch basin filters, hydrodynamic separators, and filters are used to remove pollutants.

SUMMARY OF THE INVENTION

Embodiments of the invention provide partitioned water treatment systems comprised of a box configured for installation into a flow stream of surface runoff water conveyance infrastructure (SRWC infrastructure). In some embodiments, the box possesses a ceiling, a floor, two lateral walls, two endwalls, an inflow opening, an outflow opening, a discharge chamber wall, and one or more collection rail(s). The discharge chamber wall is in sealed connection with the floor and the two lateral walls, but not the ceiling, such that the discharge chamber wall partitions the box into a filtration chamber that abuts the inflow opening and a discharge chamber that abuts the outflow opening. The inflow opening is: i. positioned in the ceiling, one of the two lateral walls, or one of the two endwalls, ii. is in sealed, fluid communication with SRWC infrastructure upstream of the partitioned water treatment system, and iii. abuts the filtration chamber. The outflow opening: i. is positioned in the floor in or in proximity with the floor in one of the two lateral walls or one of the two endwalls; ii. is in sealed, fluid communication with the SRWC infrastructure downstream of the partitioned water treatment system; and iii. abuts the discharge chamber.

Also in such embodiments, each of the one or more collection rail(s) comprises: i. a duct that extends from the discharge chamber to the filtration chamber, sealingly through the discharge chamber wall, and ii. one or more filter assemblage(s). The duct comprises an exit opening located in the discharge chamber. The one or more filter assemblage(s) comprises a vertical filter, a filter opening in the duct, and a coupler that mounts the vertical filter on the duct and places the vertical filter and the filter opening in sealed, fluid communication. The duct is configured such that: i. each of the one or more filter assemblage(s) are positioned in the filtration chamber, and ii. the duct is water impermeable apart from the exit opening and the filter opening of each of the one or more filter assemblage(s). The collection rail is operative to allow water to flow from the filtration chamber to the discharge chamber by passing through at least one of the one or more filter assemblage(s), the duct, and the exit opening.

Also in such embodiments, the top of the discharge chamber wall is positioned in the box such that in conditions of: i. low to moderate water flow through the system, a flow path of water is from the inflow opening into the filtration chamber, through at least one of the one or more collection rail(s) into the discharge chamber, and through the outflow opening; and ii. high water flow through the system, an additional flow path of water is from the inflow opening into the filtration chamber, over the discharge chamber wall into the discharge chamber, and through the outflow opening.

Embodiments of the invention provide partitioned water treatment systems comprised of a box configured for installation into a flow stream of SRWC infrastructure. In some embodiments, the box possesses a ceiling, a floor, two lateral walls, two endwalls, an inflow opening, an outflow opening, a discharge chamber wall, a separation chamber wall, and one or more collection rail(s). In such embodiments, the discharge chamber wall is in sealed connection with the floor and the two lateral walls, but not the ceiling and the separation chamber wall is in sealing connection with the floor, one of the endwalls, and the discharge chamber wall, but not the ceiling, such that the discharge chamber wall and the separation chamber wall partition the box into a separation chamber that abuts the inflow opening, a filtration chamber, and a discharge chamber that abuts the outflow opening. The inflow opening: i. is positioned in the ceiling, one of the lateral walls, or one of the endwalls; ii. is in sealed, fluid communication with the SRWC infrastructure upstream of the partitioned water treatment system; and iii. abuts the separation chamber. The outflow opening: i. is positioned in the floor in or in proximity with the floor in one of the two lateral walls or one of the two endwalls; ii. is in sealed, fluid communication with the SRWC infrastructure downstream of the partitioned water treatment system; and abuts the discharge chamber.

Also in such embodiments, each of the one or more collection rail(s) comprises: i. a duct that extends from the discharge chamber to the filtration chamber, sealingly through the discharge chamber wall, and ii. one or more filter assemblage(s). The duct comprises an exit opening located in the discharge chamber. The one or more filter assemblage(s) comprises a vertical filter, a filter opening in the duct, and a coupler that mounts the vertical filter on the duct and places the vertical filter and the filter opening in sealed, fluid communication. The duct is configured such that: i. each of the one or more filter assemblage(s) are positioned in the filtration chamber, and ii. the duct is water impermeable apart from the exit opening and the filter opening of each of the one or more filter assemblage(s). The collection rail is operative to allow water to flow from the filtration chamber to the discharge chamber by passing through at least one of the one or more filter assemblage(s), the duct, and the exit opening.

Also in such embodiments, the top of the discharge chamber wall and the top of the separation chamber wall are positioned in the box such that in conditions of: i. low to moderate water flow through the system, a flow path of water is from the inflow opening into the separation chamber, over the separation chamber wall into the filtration chamber, through at least one of the one or more collection rail(s) into the discharge chamber, and through the outflow opening; and ii. high water flow through the system, an additional flow path of water is from the inflow opening into the separation chamber, over the discharge chamber wall into the discharge chamber, and through the outflow opening.

In some embodiments, partitioned water treatment systems further comprise a cap or a plug sealingly mounted on the exit opening. In such embodiments, the cap or the plug is water impermeable apart from one or more aperture(s) sized, individually or in aggregate, to control a rate of water flow through the duct that is less than a maximum rate of water flow through at least one filter of the one or more filter assemblage(s).

In some embodiments, partitioned water treatment systems further comprise a diversion weir in the separation chamber wall adjacent to the discharge chamber wall. In such embodiments, the diversion weir is configured to permit water to flow therethrough and is thereby operative to increase: i. an average distance travelled by water through the separation chamber prior to flowing into the filtration chamber; and therefor ii. an amount of sediment settling in the filtration chamber.

In some embodiments, partitioned water treatment systems further comprise a bypass weir in the discharge chamber wall adjacent to the separation chamber. In such embodiments, the bypass weir is configured to establish, in the condition of high water flow through the system, a second additional flow path of water from the inflow opening into the separation chamber, through the bypass weir into the discharge chamber, and through the outflow opening. In such embodiments, the second additional water flow path reduces an amount of scouring of sediments out of the separation chamber that results from water flowing over the top of the filtration chamber wall.

In some embodiments, partitioned water treatment systems further comprise a velocity shield mounted in the separation chamber abutting the inflow opening.

In some embodiments, partitioned water treatment systems further comprise a flow director mounted on a side of the discharge chamber wall that abuts the first filtration chamber.

In some embodiments, partitioned water treatment systems further comprise an oil skimmer unit mounted in the separation chamber.

In some embodiments, partitioned water treatment systems further comprise a bypass filtration basket mounted in proximity with the top of the discharge chamber wall.

In some embodiments, the vertical filter of at least one of the one or more filter assemblage(s) comprises a sheet of filter material formed into a cylinder closed by a top end that is water impermeable and a bottom end that is water impermeable apart from an opening through which water can flow. In such embodiments, the coupler is adapted to place the opening in the bottom end of the vertical filter in sealed, fluid communication with the filter opening of the at least one of the one or more filter assemblage(s).

In some embodiments, the sheet of filter material is selected from the group consisting of a plastic, a paper, a fiberglass, and a combination thereof. In some embodiments, the sheet of filter material comprises back and forth folds that form a series of pleats. In some embodiments, the coupler of at least one of the one or more filter assemblage(s) is adapted to removeably mount the vertical filter on the duct.

In some embodiments, the coupler comprises hardware selected from the group consisting of a friction fitting, a pressure fitting, a threaded fitting, a bolt, a screw, a nail, and a clamp.

In some embodiments, partitioned water treatment systems further comprise a flow control assembly, wherein the flow control assembly is positioned in the discharge chamber and is in sealed, fluid communication with the exit opening of at least one of the one more collection rail(s). In some embodiments, the flow control assembly further comprises a mechanical gate. In some embodiments, the mechanical gate is selected from the group consisting of a cam lock gate, a float gate, a float valve, a pressure gate, a floating weir, a slide gate, a tilt weir, and a lift gate. In some embodiments, the ceiling of the box possesses an access hatch.

In some embodiments, partitioned water treatment systems further comprise an air release valve on the top of the flow control assembly configured to allow air to leave the inside of the flow control assembly as an air pressure inside of the flow control assembly increases above a release threshold of the air release valve due to an increase in water level within the flow control assembly.

Embodiments of the invention provide collection rails configured for installation in a partitioned water treatment system that comprises a filtration chamber and a discharge chamber, the collection rail comprising a duct and one or more filter assemblage(s). The duct comprises an exit opening located in or near an end of the duct. The one or more filter assemblage(s) comprise(s) a vertical filter, a filter opening in the duct, and a coupler that mounts the vertical filter on the duct and places the vertical filter and the filter opening in sealed, fluid communication. The duct is configured to position, when installed in the water treatment system: i. each of the one or more filter assemblage(s) in the filtration chamber, and ii. the exit opening in the discharge chamber. The collection rail is configured to establish, when installed in the water treatment system, a flow path for water from the filtration chamber through at least one of the one or more filter assemblage(s), the duct, the outflow opening, and into the discharge chamber.

In some embodiments, the vertical filter of at least one of the one or more filter assemblage(s) comprises a sheet of filter material formed into a cylinder closed by a top end that is water impermeable and a bottom end that is water impermeable apart from an opening through which water can flow. In such embodiments, the coupler is adapted to place the opening in the bottom end of the vertical filter in sealed, fluid communication with the filter opening of the at least one of the one or more filter assemblage(s).

In some embodiments, the sheet of filter material is selected from the group consisting of a plastic, a paper, a fiberglass, and a combination thereof. In some embodiments, the sheet of filter material comprises back and forth folds that form a series of pleats.

In some embodiments, the coupler of at least one of the one or more filter assemblage(s) is adapted to removeably mount the vertical filter on the duct. In some embodiments, the coupler comprises hardware selected from the group consisting of a friction fitting, a threaded fitting, a bolt, a screw, a nail, and a clamp.

In some embodiments, the SRWC infrastructure downstream of the system includes a water storage unit that comprises a second box. The second box possesses: i. a roof, a deck, two side walls, and two second box endwalls that form a storage chamber; ii. an influent opening; and iii. an effluent opening. The influent opening is: i. positioned in the roof or above the effluent opening in one of the two side walls or one of the two second box endwalls; and ii. in sealed, fluid communication with the outflow opening. The effluent opening is positioned in the deck or in proximity with the deck in one of the two side walls or one of the two second box endwalls. And the second box is configured such that water flows from the influent opening through the storage chamber and through the effluent opening. In some embodiments, the outflow opening adjoins the influent opening. In some embodiments, a tube places the outflow opening and the influent opening in sealed, fluid communication.

In some embodiments, the SRWC infrastructure upstream of the system includes a water storage unit that comprises a second box. The second box possesses: i. a roof, a deck, two side walls, and two second box endwalls that form a storage chamber; ii. an influent opening; and iii. an effluent opening. The influent opening is positioned in the roof or above the effluent opening in one of the two side walls or one of the two second box endwalls. The effluent opening is: i. positioned in the deck or in proximity with the deck in one of the two side walls or one of the two second box endwalls, and ii. in sealed, fluid communication with the inflow opening. And the second box is configured such that water flows from the influent opening through the storage chamber and through the effluent opening. In some embodiments, the inflow opening adjoins the effluent opening. In some embodiments, a tube places the effluent opening and the inflow opening in sealed, fluid communication.

In some embodiments, the SRWC infrastructure downstream of the system includes a water storage unit comprising a second box. The second box possesses: i. a roof, a deck, two side walls, two second box endwalls, a storage chamber wall; ii. an influent opening, and iii. an effluent opening. The storage chamber wall is in sealed connection with the two side walls and the deck, but not the roof, such that the storage chamber wall partitions the second box into a storage chamber that abuts the influent opening and an effluent chamber that abuts the effluent opening. The influent opening is: i. positioned in the roof or above the effluent opening in one of the two side walls or one of the two second box endwalls; and ii. in sealed, fluid communication with the outflow opening. The effluent opening is positioned in the deck or in proximity with the deck in one of the two side walls or one of the two second box endwalls. The second box is configured such that water flows from the influent opening through the storage chamber and through the effluent opening. And the storage chamber wall comprises a storage flow control opening, such that in conditions of: i. low to moderate water flow through the water storage unit, a flow path of water through the storage unit is from the influent opening into the storage chamber, through the storage flow control opening into the effluent chamber, and through the effluent opening, and ii. high water flow through the water storage unit, an additional flow path of water through the storage unit is from the influent opening into the storage chamber, over the storage chamber wall into the effluent chamber, and through the effluent opening. In some embodiments, the outflow opening adjoins the influent opening. In some embodiments, a tube places the outflow opening and the influent opening in sealed, fluid communication.

In some embodiments, the SRWC infrastructure upstream of the system includes a water storage unit comprising a second box. The second box possesses: i. a roof, a deck, two side walls, two second box endwalls, a storage chamber wall; ii. an influent opening; and iii. an effluent opening. The storage chamber wall is in sealed connection with the two side walls and the deck, but not the roof, such that the storage chamber wall partitions the second box into a storage chamber that abuts the influent opening and an effluent chamber that abuts the effluent opening. The influent opening is positioned in the roof or above the effluent opening in one of the side two walls or one of the two second box endwalls. The effluent opening is: i. positioned in the deck or in proximity with the deck in one of the two side walls or one of the two second box endwalls; and ii. in sealed, fluid communication with the inflow opening. The second box is configured such that water flows from the influent opening through the storage chamber and through the effluent opening. And the storage chamber wall comprises a storage flow control opening, such that in conditions of: i. low to moderate water flow through the water storage unit, a flow path of water through the storage unit is from the influent opening into the storage chamber, through the storage flow control opening into the effluent chamber, and through the effluent opening, and ii. high water flow through the water storage unit, an additional flow path of water through the storage unit is from the influent opening into the storage chamber, over the storage chamber wall into the effluent chamber, and through the effluent opening. In some embodiments, the inflow opening adjoins the effluent opening. In some embodiments, a tube places the inflow opening and the effluent opening in sealed, fluid communication.

Embodiments of the invention provide methods of treating surface runoff water in a conveyance system, by installing into the conveyance system a partitioned water treatment system of the invention. Embodiments of the invention provide methods of maintaining a partitioned water treatment system of the invention, the methods involve removing debris from at least one of a separation chamber, a filter chamber, and a discharge chamber from a partitioned water treatment system having vertical filters of the invention. Embodiments of the invention provide methods of maintaining a partitioned water treatment system of the invention, the methods involve cleaning or replacing at least one of a vertical filter, a oil skimmer, and a bypass basket of a partitioned water treatment system having vertical filters of the invention.

DETAILED DESCRIPTION OF THE INVENTION

The present invention provides partitioned water treatment systems that possess a plurality of chambers and vertical filtration units, and are operative to control and filter surface runoff water. Such systems typically have an overall shape of a box and are placed inline with runoff water conveyance system infrastructure, such as pipes, channels, ditches, canals, and water storage units. Partitioned water systems of the invention can comprise shapes such as triangular or circular.

Figure 1:
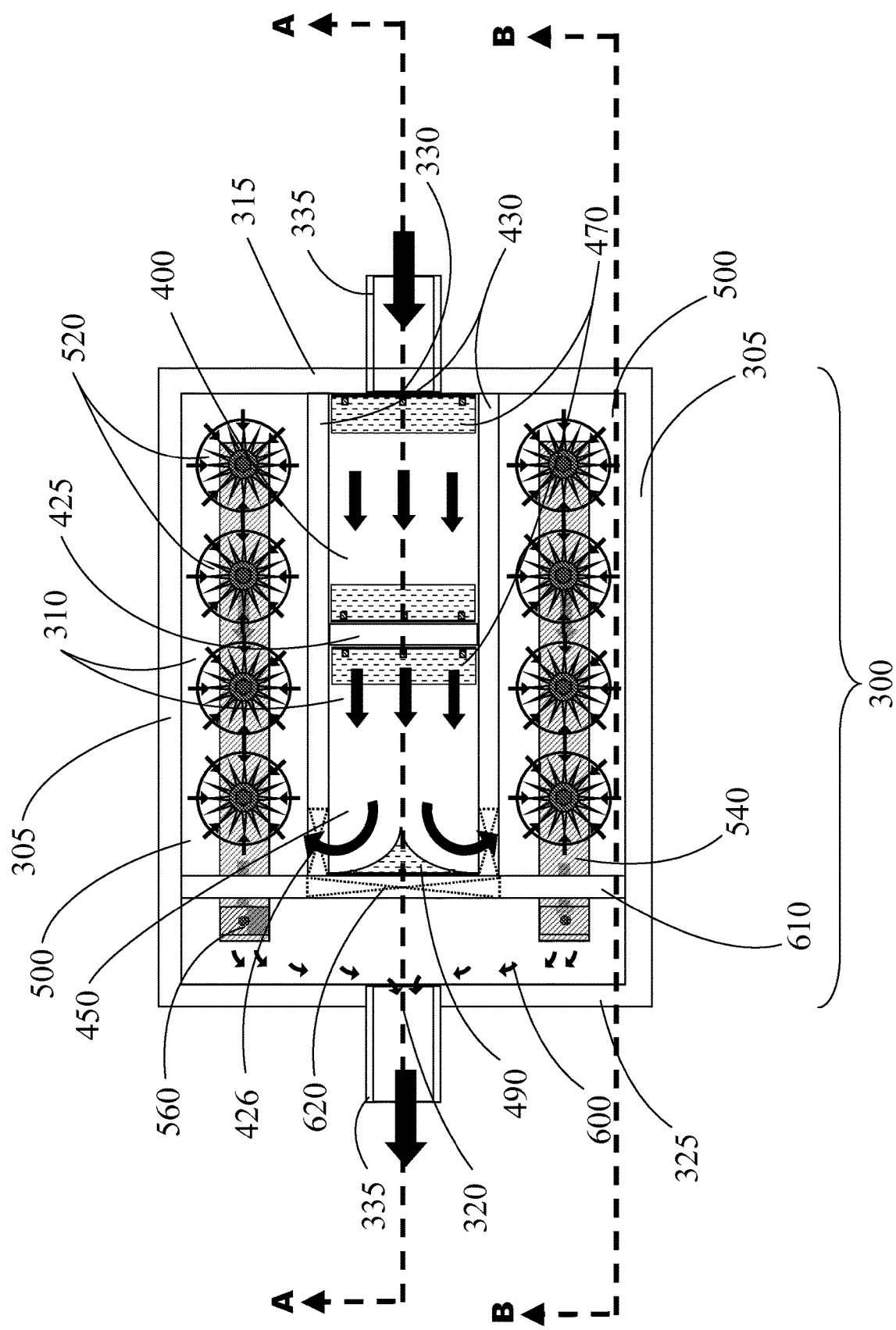
FIG. 1. Top-view, cut-out schematic of an embodiment of the invention in low to moderate water flow conditions.
Figure 2:
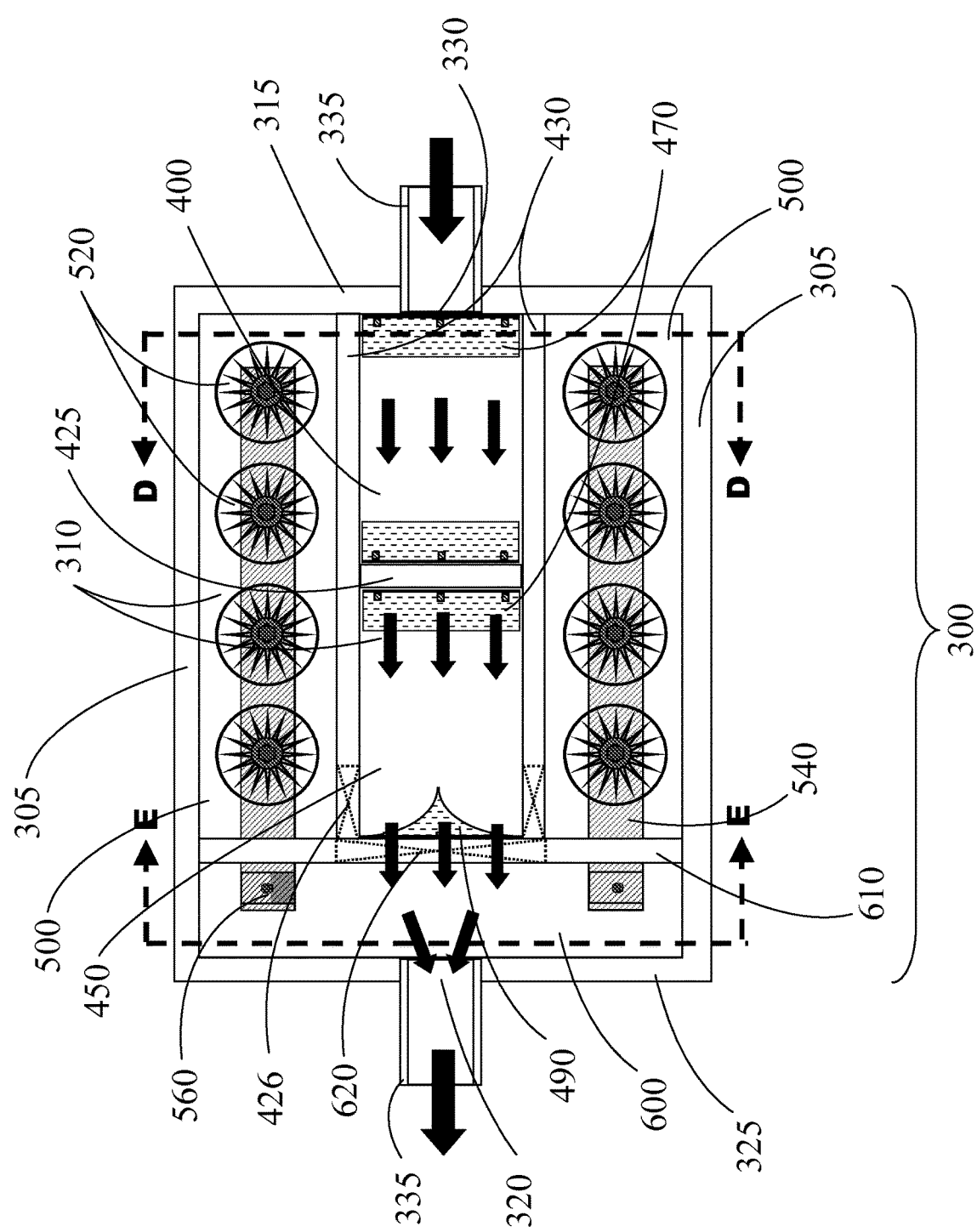
FIG. 2. Top-view, cut-out schematic of the embodiment of the invention in high water flow conditions.
Figure 3:
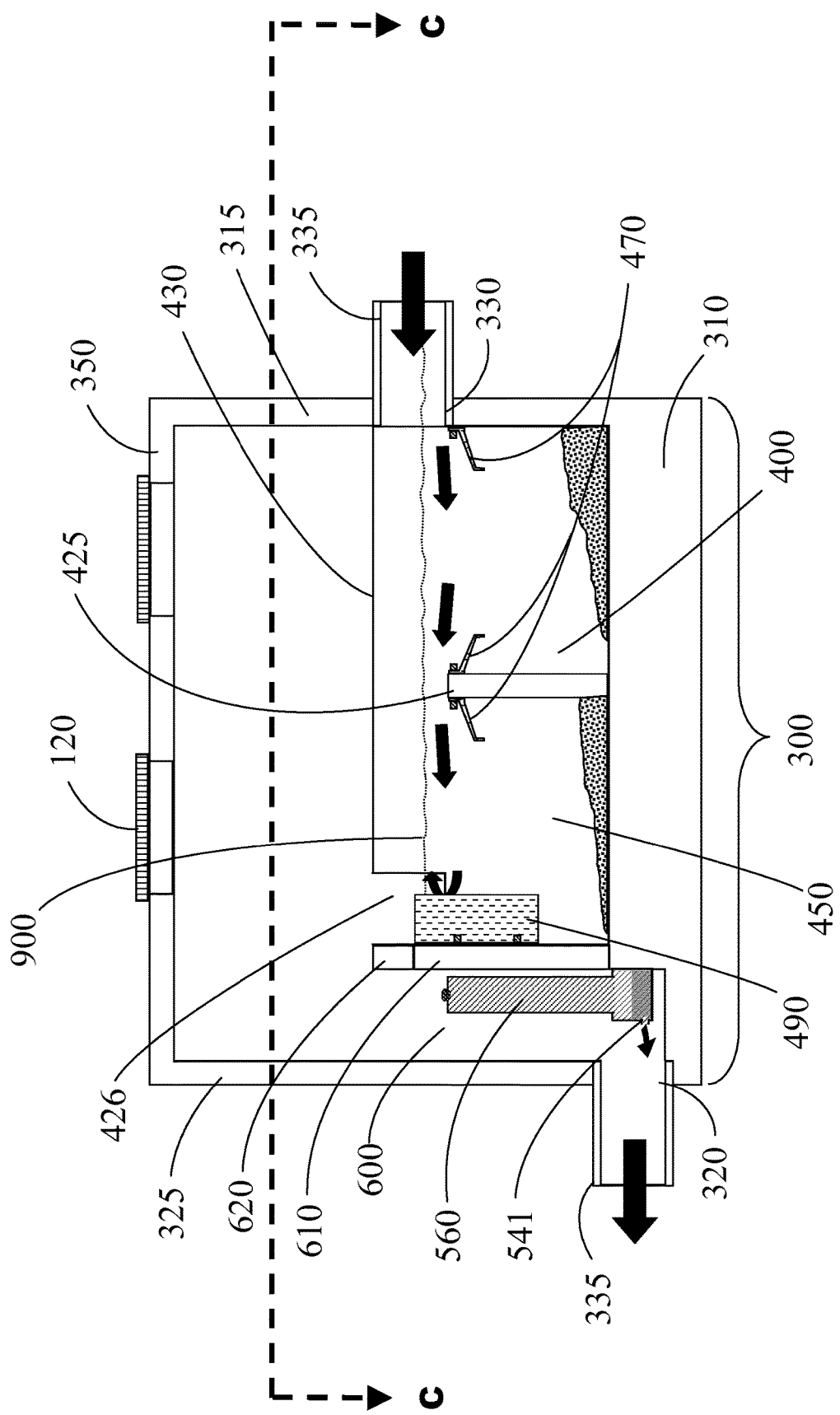
FIG. 3. Side-view, cut-out schematic of an embodiment of the invention in low to moderate water flow conditions.
Figure 4:
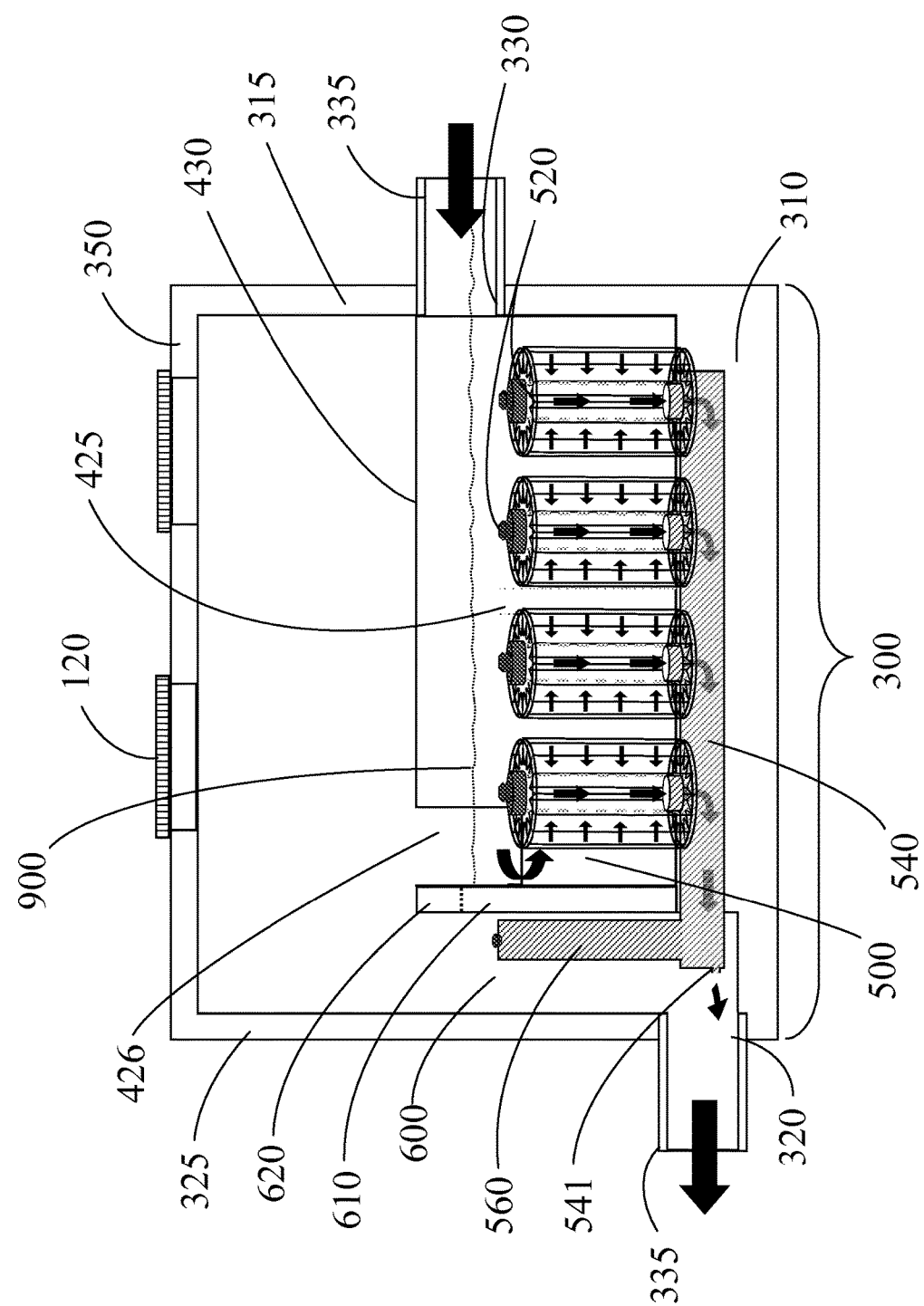
FIG. 4. Side-view, cut-out schematic of an embodiment of the invention in low to moderate water flow conditions.
Figure 5:
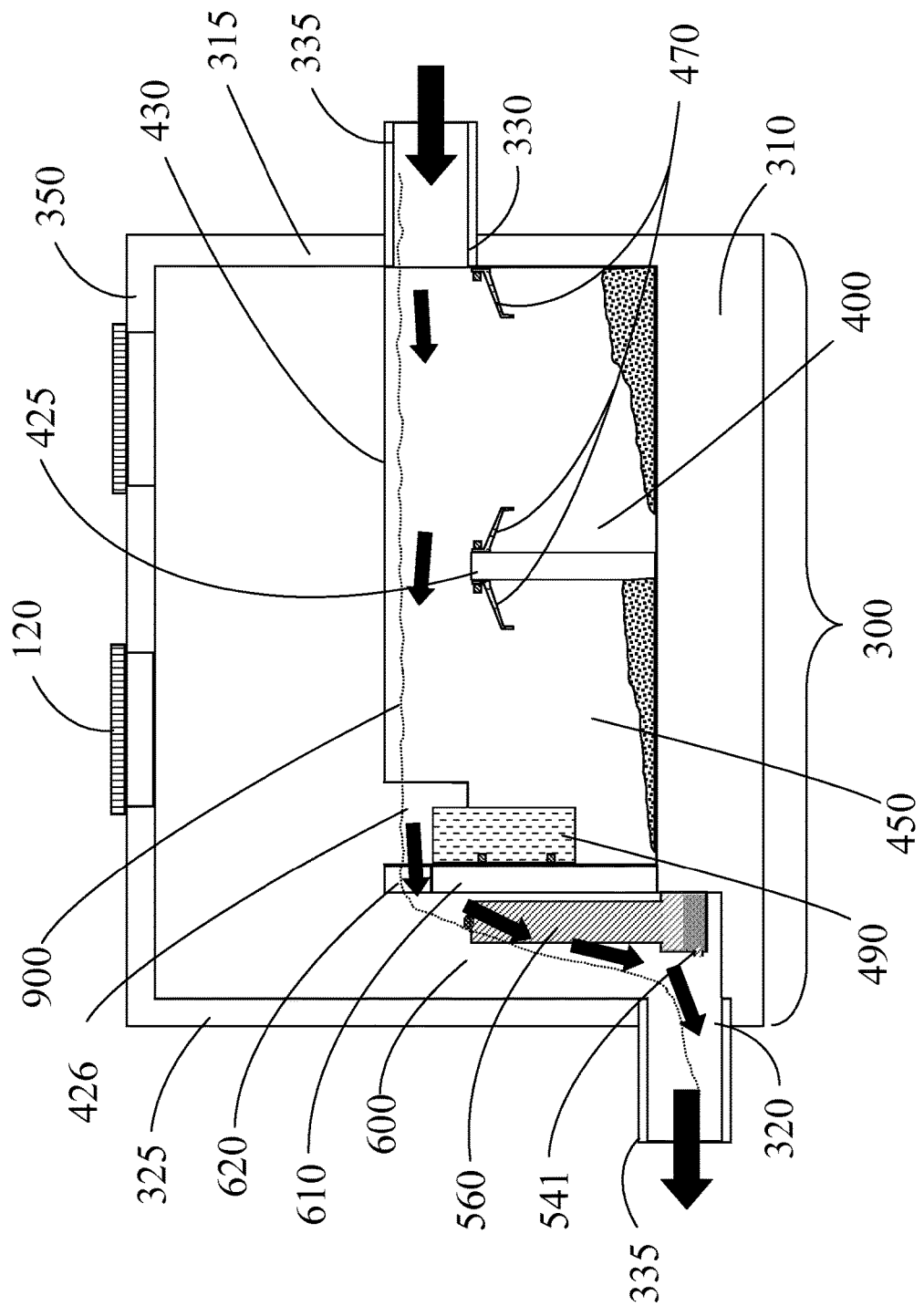
FIG. 5. Side-view, cut-out schematic of an embodiment of the invention in high water flow conditions.

FIGS. 1-5 show different views of an embodiment of a partitioned water treatment system with vertical filtration units according to the invention. FIGS. 1 and 2 show top-views of the embodiment, cut-out along dashed line C of FIG. 3, in low to moderate water flow conditions and in high water flow conditions, respectively. FIGS. 3 and 5 show side-views of the embodiment, cut-out along dashed line A of FIG. 1, in low to moderate water flow conditions and in high water flow conditions, respectively. FIG. 4 shows a side-view of the embodiment, cutout along dashed line B in FIG. 1, in low to moderate water flow conditions.

Referring to FIG. 1, box 300 possesses two lateral walls 305, floor 310, ceiling 350 (see FIG. 3), a first endwall 315 that comprises inflow opening 330, and a second endwall 325 that comprises outflow opening 320. In box 300, inflow opening 330 and outflow opening 320 are configured to allow for the placement of box 300 inline with runoff water conveyance pipe 335. Runoff water flows through conveyance pipe 335 and box 300 in the directions indicated by the water-flow schematic arrows.

Box 300 is made of solid, durable, and strong material(s) such as concrete, metal, wood, stone, and fiberglass. Several walls partition box 300 into primary separation chamber 400, secondary separation chamber 450, filtration chambers 500, and discharge chamber 600, each possessing a rectangular or square shape. Separation chamber walls 430 are each in sealed connection with each of first endwall 315, discharge chamber wall 610, separation chamber partition wall 425, and floor 310 of box 300, but not the ceiling of box 300, forming primary separation chamber 400 and secondary separation chamber 450. The top of separation chamber partition wall 425 is positioned below or equal to the bottom of inflow opening 330 and below the top of the section of separation chamber walls 430 that abuts primary separation chamber 400 and a portion of secondary separation chamber 450 (also see FIG. 3). This configuration results in low to moderate amounts of water entering inflow opening 330 filling primary separation chamber 400 and then flowing over separation chamber partition wall 425 into secondary separation chamber 450. In the process, sufficiently dense and heavy waterborne sediment and debris are deposited in primary separation chamber 400 for later removal.

The tops of separation chamber walls 430 form notches 426 abutting discharge chamber wall 610. The bottom of notches 426 are positioned substantially even with the top of separation chamber partition wall 425 (also see FIGS. 3 and 7). This configuration results in low to moderate amounts of water flowing over the top of primary separation chamber wall 425 filling secondary separation chamber 450 and flowing through notches 426 (also referred to as "diversion weirs") into filtration chambers 500. In the process, sufficiently dense and heavy waterborne sediment and debris are deposited in secondary separation chamber 450 for later removal. In some embodiments, the bottom of notches 426 is positioned below the top of separation chamber partition wall 425.

Figure 11:
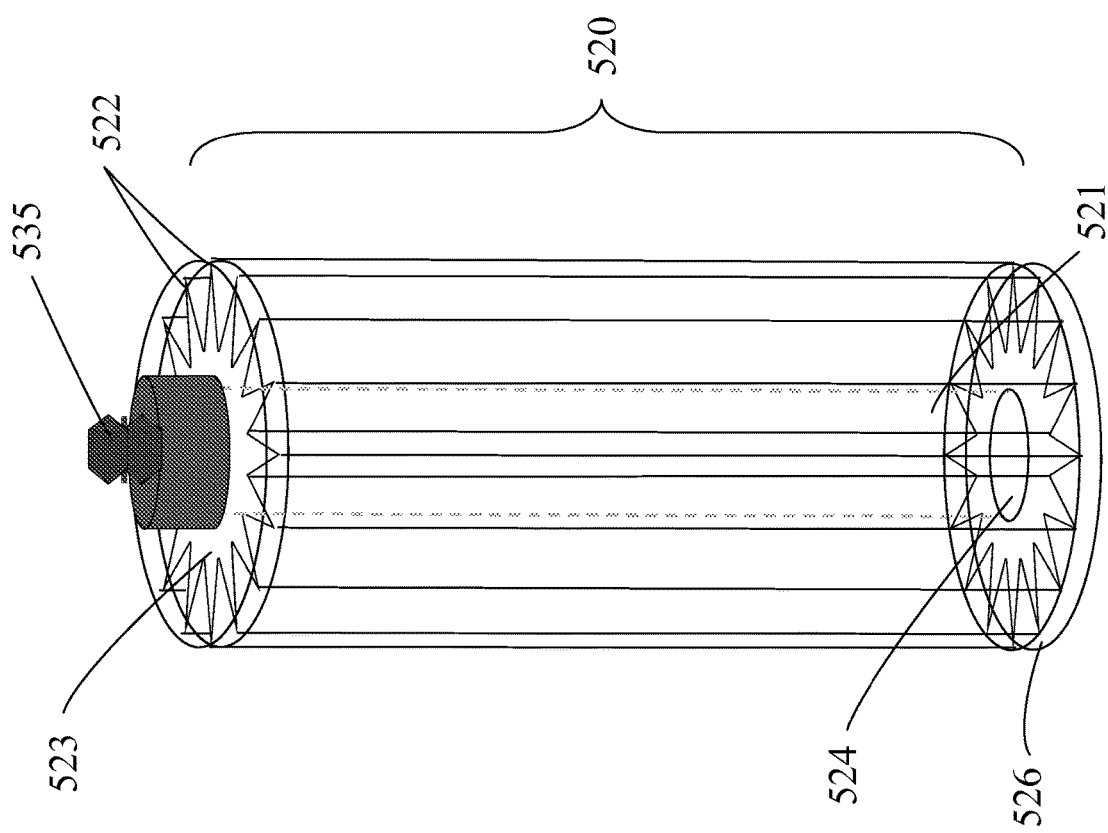
FIG. 11. Isolation view of an embodiment of a vertical filtration unit of the invention.

Referring again to FIG. 1, separation chamber walls 430 further form filtration chambers 500. Filtration chambers 500 possess vertical filtration units 520 mounted on collection rails 540 (also see FIG. 4). As illustrated in FIG. 11, vertical filtration units 520 comprise a sheet of filter material, such as porous plastic, paper, or fiberglass, folded back and forth into a series of pleats 522 formed into a hollow cylinder 521, the ends of which are sealed closed by water impermeable top end 523 and bottom end 522 that is only permeable to water through bottom end opening 524. Bottom end 522 and top end 523 are made from strong, durable material such as metal, plastic, or fiberglass. Top end of 523 of vertical filtration unit 520 also possesses handle 535. Vertical filtration units 520 are operative to remove, from water flowing therethrough, waterborne particulate matter such as large and fine sediments and debris.

Figure 12:
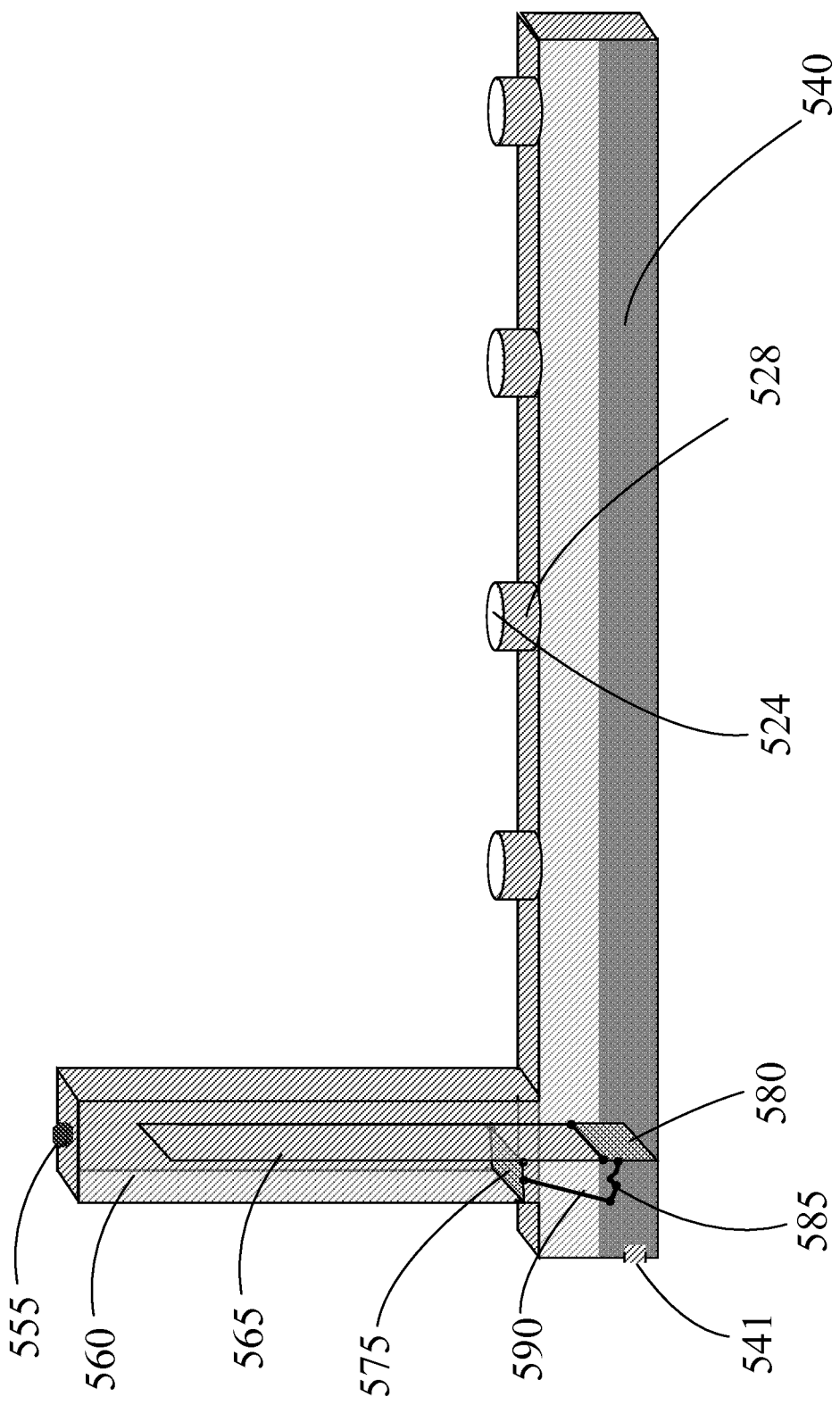
FIG. 12. Isolation view of an embodiment of a collection rail of the invention (filter assemblages not shown).

Referring again to FIG. 1, collection rails 540 extend substantially the entire length of filtration chambers 500, through discharge chamber wall 610 and partway into discharge chamber 600, in proximity with floor 310 of box 300. Collection rails 540 are made of strong and durable material (s) such as concrete, metal, plastic, or fiberglass and fixedly support vertical filtration units 520 mounted thereon. Collection rails 540 possess a duct structure, closed and water impermeable apart from water exit openings 541 at their ends in discharge chamber 600 and filter openings 529 that are inline with each of the openings of bottom end opening 524 of vertical filtration units 520 mounted thereon by coupler 528, which is adapted to place vertical filter 520 in sealed, fluid communication with the interior of the duct of collection rail 540 (FIGS. 1, 11, and 12). Vertical filtration units 520 are each mounted on collection rails 540 in a manner that permits water to flow from filtration chambers 500 into collection rails 540 only by passing through the cylinders 521 and bottom end openings 524 of vertical filtration units 520 and then through exit openings 541 of collection rails 540 (FIGS. 1, 11, and 12). This configuration results in low to moderate amounts of water filling filtration chambers 500 flowing first through vertical filtration units 520, then into collection rails 540, and then into discharge chamber 600.

In some embodiments, exit openings 541 are sized to control the rate at which water flows through the system. By limiting water flow through vertical filtration units 520 to a rate lower than the capacity thereof, the pollutant removal efficiency and the useful life between maintenance and/or replacement of vertical filtration units 520 can be increased.

Referring again to FIG. 1, discharge chamber wall 610 is in sealed connection with each of lateral walls 305, second endwall 325, and floor 310 of box 300, but not the ceiling of box 300, forming discharge chamber 600. Outflow opening 320 is in fluid communication with conveyance pipe 335 at a position abutting floor 310 of box 300. This configuration results in water entering discharge chamber 600 flowing into conveyance pipe 335.

In the process of performing their filtration functions, vertical filtration units 520 and collection rails 540 impede the flow of water from filtration chambers 500 into discharge chambers 600. This impedance makes possible conditions in which water enters inflow opening 330 at a rate greater than it flows from filtration chambers 500 into discharge chamber 600 through vertical filtration units 520 and collection rail 540 ("high flow conditions"). The top of the section of discharge chamber wall 610 that abuts secondary separation chamber 450 and diversion weir 426 of separation chamber walls 430 is positioned between the top of diversion weir 426 and the top of discharge chamber wall 610, forming bypass weir 620. Under high flow conditions, water level 900 rises in filter chambers 500 to the point that water flows over bypass weir 620 into discharge chamber 600 (FIGS. 2 and 5). Under high flow conditions, it is possible for water levels to rise above the highest sections of separation chamber walls 430 and discharge chamber wall 610; and during such conditions water flows over the entirety of discharge chamber wall 610 into discharge chamber 600 (not shown).

The embodiment of a partitioned water treatment system with vertical filtration units according to the invention shown in FIGS. 1-5 possesses velocity shields 470 installed into primary separation chamber 400 and secondary separation chamber 450. Velocity shields 470 are made of strong, solid, and durable material(s) such as metal, fiberglass, or plastic. Referring again to FIG. 1, the velocity shields 470 installed in primary separation chamber 400 are fixedly mounted on inflow chamber wall 315 and separation chamber partition wall 425, positioned slightly below the bottom of inflow opening 330 and the top of separation chamber partition wall 425. And they extend partway into separation primary separation chamber 400 at a slight downangle. In this configuration, the primary separation chamber 400 velocity shields 470 function to impede water, entering primary separation chamber 400 through inflow opening 330 at a moderate to high rate of speed, from establishing circulation patterns within primary separation chamber 400 that are operative to i. resuspend sediment and debris deposited on the floor of primary separation chamber 400, and ii. carry resuspended sediment and debris out of primary separation chamber 400 into secondary separation chamber 450.

The velocity shield 470 installed in secondary separation chamber 450 is fixedly mounted on separation chamber partition wall 425, positioned slightly below the top thereof. It extends partway into separation secondary separation chamber 450 at a slight downangle. In this configuration, the secondary separation chamber 450 velocity shield 470 functions to impede water, entering primary separation chamber 450 from primary separation chamber 400 at a moderate to high rate of speed, from establishing circulation patterns within secondary separation chamber 450 that are operative to i. resuspend sediment and debris deposited on the floor of secondary separation chamber 450, and ii. carry resuspended sediment and debris out of secondary separation chamber 450 into filtration chambers 500.

The embodiment of a partitioned water treatment system with vertical filtration units according to the invention shown in FIGS. 1-5 possesses flow director 490 installed into secondary separation chamber 450. Flow director 490 is made of strong, solid, and durable material(s) such as metal, fiberglass, or plastic. Referring again to FIG. 1, flow director 490 is fixedly mounted on discharge chamber wall 610, and possesses a contoured surface that promotes the laminar flow of water from secondary separation chamber 450 into filtration chamber 500.

The embodiment of a partitioned water treatment system with vertical filtration units according to the invention shown in FIGS. 1-5 possesses flow control assemblies 560 installed on the ends of flow control rails 540 in discharge chamber 600. Flow control assemblies 560 are made of a strong and durable material such as concrete, metal, plastic, or fiberglass and cap the lateral openings of collection rails 540. Flow control assemblies 560 possess a hollow structure and an internal flow control wall (not shown) in sealed communication with both internal side walls of flow control assembly 560 and the floor of collection rail 540 but not the internal ceiling of flow control assembly 560 and is therefore configured to vertically redirect water flowing horizontally out of collection rails 540 over the top of the flow control wall out of flow control assembly into discharge chamber 600. The position of the top of the flow control is the level, in filtration chambers 500, to which water will rise prior to flowing through flow control assemblies 560, out of collection rails 540, and into discharge chamber 600. In preferred embodiments, flow control assemblies 560 are sized and configured to cause water, in filtration chamber 500, to rise to a level substantially even with the top of vertical filtration units 520 prior to flowing through flow control assemblies 560, out of collection rails 540, and into discharge chamber 600. Such configuration provides for a substantially uniform vertical loading of waterborne sediment and debris filtered by vertical filtration unit 520.

Figure 8:
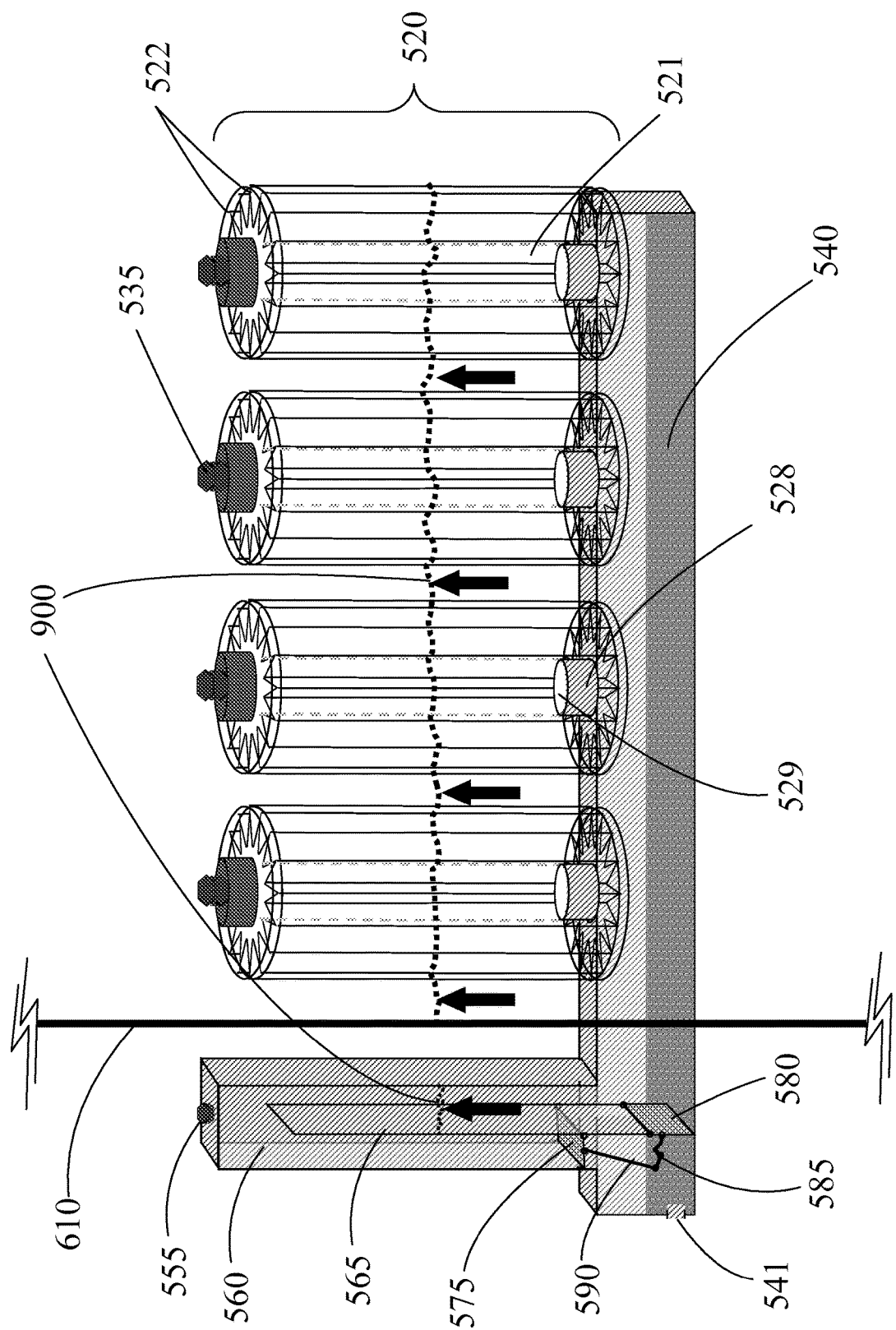
FIG. 8. Isolation view of a collection rail of the invention fitted with an outflow assembly that possesses a mechanical gate in a closed configuration.

The internal configuration of flow control assembly 560 illustrated in FIGS. 1-5 differs from the flow control assembly illustrated in FIG. 8 by lacking a mechanical gate. In some embodiments, flow control assemblies comprise flow control assembly drain down openings in their internal walls in proximity with the floor of the collection rail and configured to allow water to drain out of collection rails 540 during conditions of low or no water flow into the system. In flow control assembly embodiments that comprise a gate, flow control assembly drain down openings can be position in the gate. Some embodiments of partitioned water treatment systems lack flow control assemblies.

Figure 6:
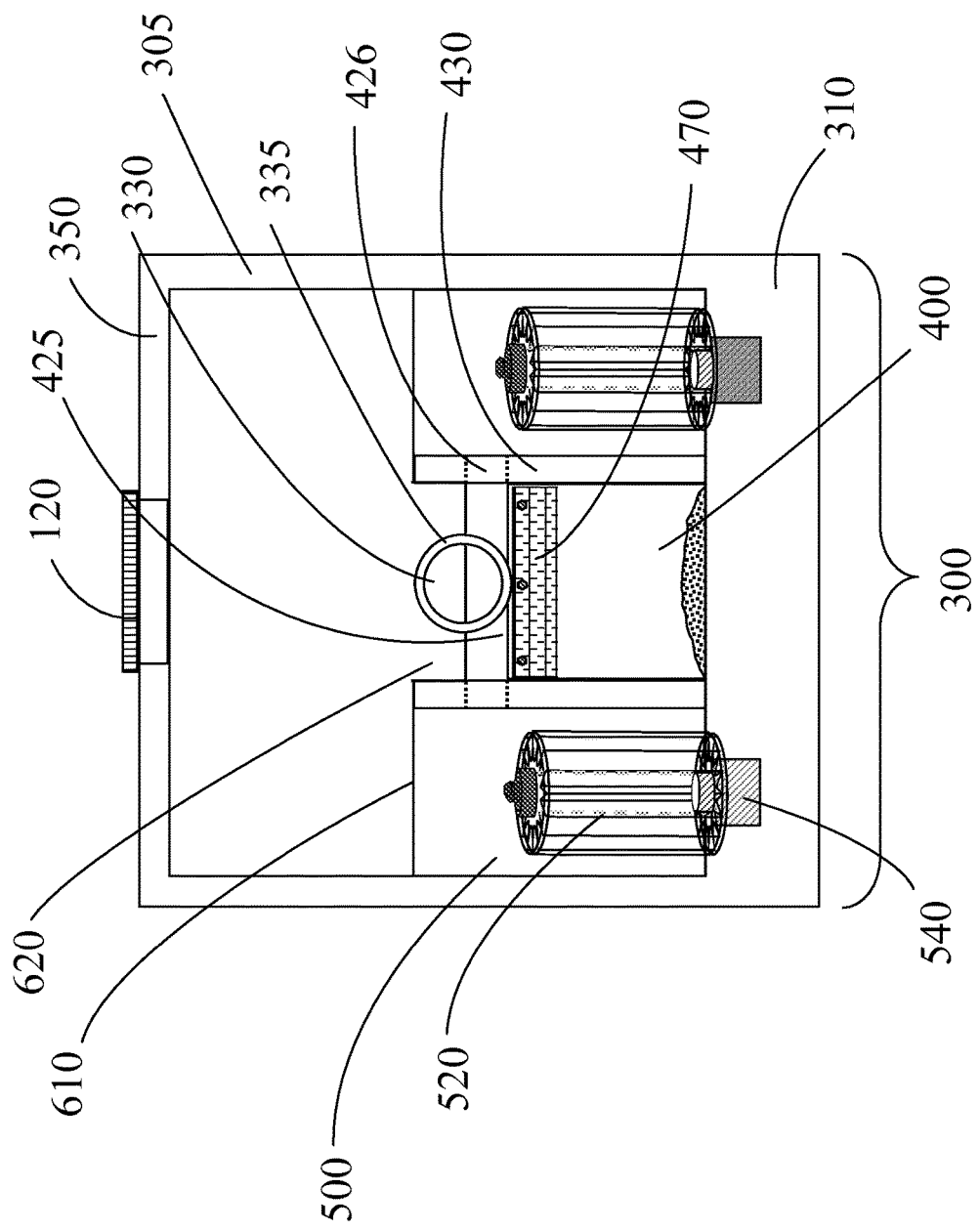
FIG. 6. Inflow end, cut-out view of an embodiment of the invention.

FIG. 6 shows an inflow end view, cut-out along dashed line D of FIG. 2, of the partitioned water treatment system with vertical filtration units shown in FIGS. 1-5. As can be seen, box 300 possesses a first access hatch comprised of a first opening in ceiling 350 and a first removable cover 120.

Figure 7:
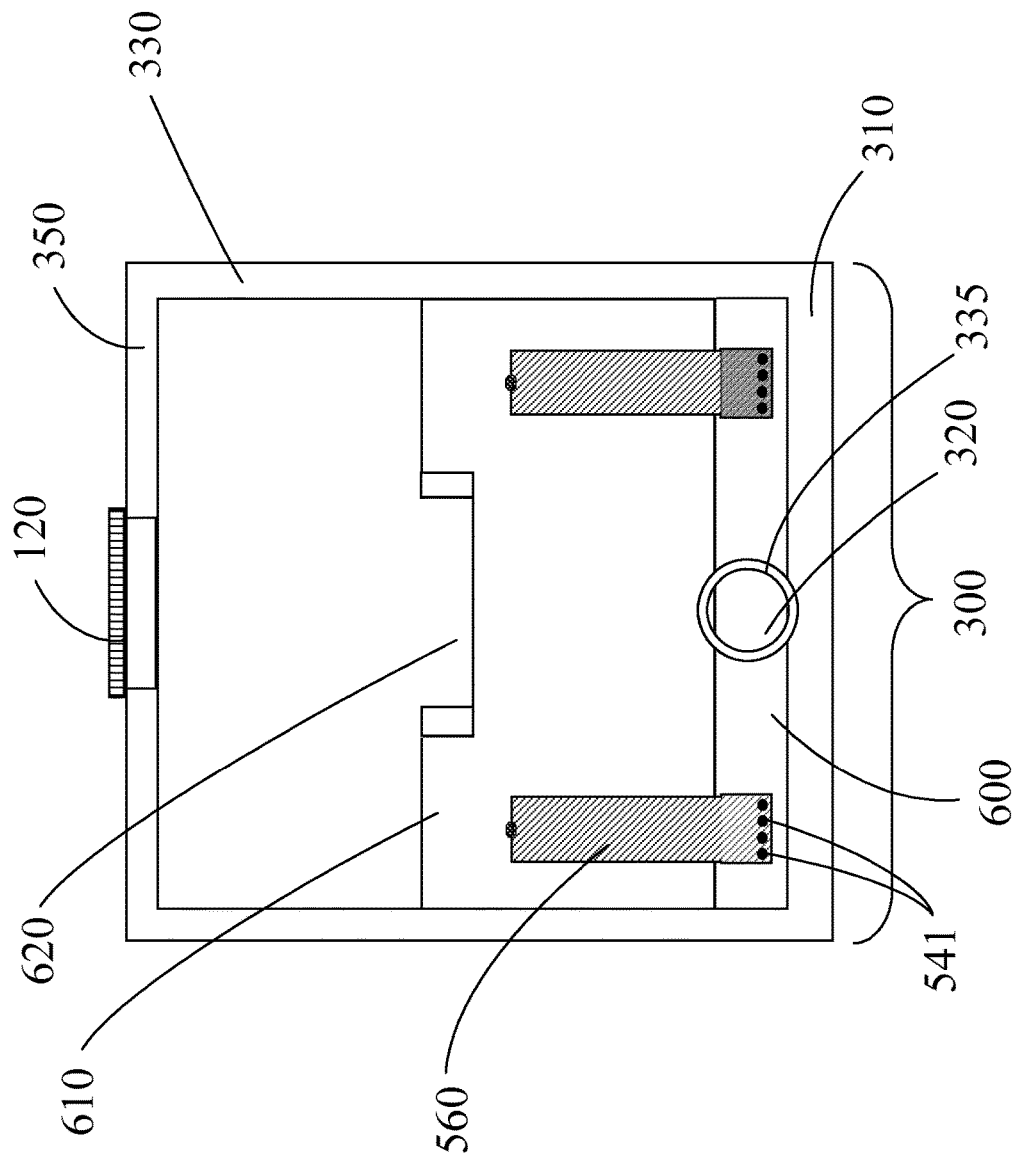
FIG. 7. Outflow end, cut-out view of an embodiment of the invention.

FIG. 7 shows an outflow end view, cut-out along dashed line E of FIG. 2, of the partitioned water treatment system with vertical filtration units shown in FIGS. 1-5. As can be seen, box 300 possesses a second access hatch comprised of a second opening in ceiling 350 and a second removable cover 120. Also seen are water outflow orifices 541 in flow control assemblies 560, through which water enters discharge chamber 600 from collection rails 520.

FIG. 8 shows an embodiment of a collection rail 540 fitted with a flow control assembly 560 that possesses an air release valve 555 and a mechanical gate in a closed configuration. Air release valve 555 is configured to release air from the interior of flow control assembly 560 upon air pressure therein building to a threshold release level of air release valve 555, and air release valve 555 is operational to promote laminar flow of water over the top of gate weir 565. Air release valves useful in flow control assemblies include one-way valves and two-way valves. The mechanical gate is installed inside of flow control assembly 560 possesses a hollow structure. Flow control assembly 560 is in sealed connection with collection rail 540 and is in fluid communication with collection rail 540. The mechanical gate comprises gate weir 565, release flap 575, flow gate 580, cam lock 585, and cam lock connector rod 590. Gate weir 565 is in sealed connection with two lateral walls of flow control assembly 560, two lateral walls of collection rail 540, and the floor of collection rail 540, but not the ceiling of flow control assembly 560. Flow gate 580 is in substantially sealed connection with two lateral walls of flow control assembly 560, and is rotatably mounted on the bottom of gate weir 565 and is in moveable contact with the floor and side walls of collection rail 540.

Release flap 575 is mounted between the lateral walls of flow control assembly 560 in a manner that allows for its rotation through an approximately 90 degree arc between substantially horizontal and vertical positions. Cam lock 585 and cam lock connector rod 590 are mounted between flap 575 and gate 580. When, as shown in FIG. 8, the mechanical gate is in the closed configuration, gate 580 impedes the flow of water out of collection rail 540 such that water enters filtration chamber 500 at a rate greater than it flows out of collection rail 540, causing water level 900 therein and in flow control assembly 560 to rise as indicated by the water-flow schematic arrows. Cam lock 585 and cam lock connector rod 590 prevent water pressure exerted on gate 580 from causing gate 580 to rotate into an open position by transmitting: i. weight of flap 575 to gate 580, and ii. the operational rotation limit of flap 575 at the substantially horizontal position to gate 580.

Figure 9:
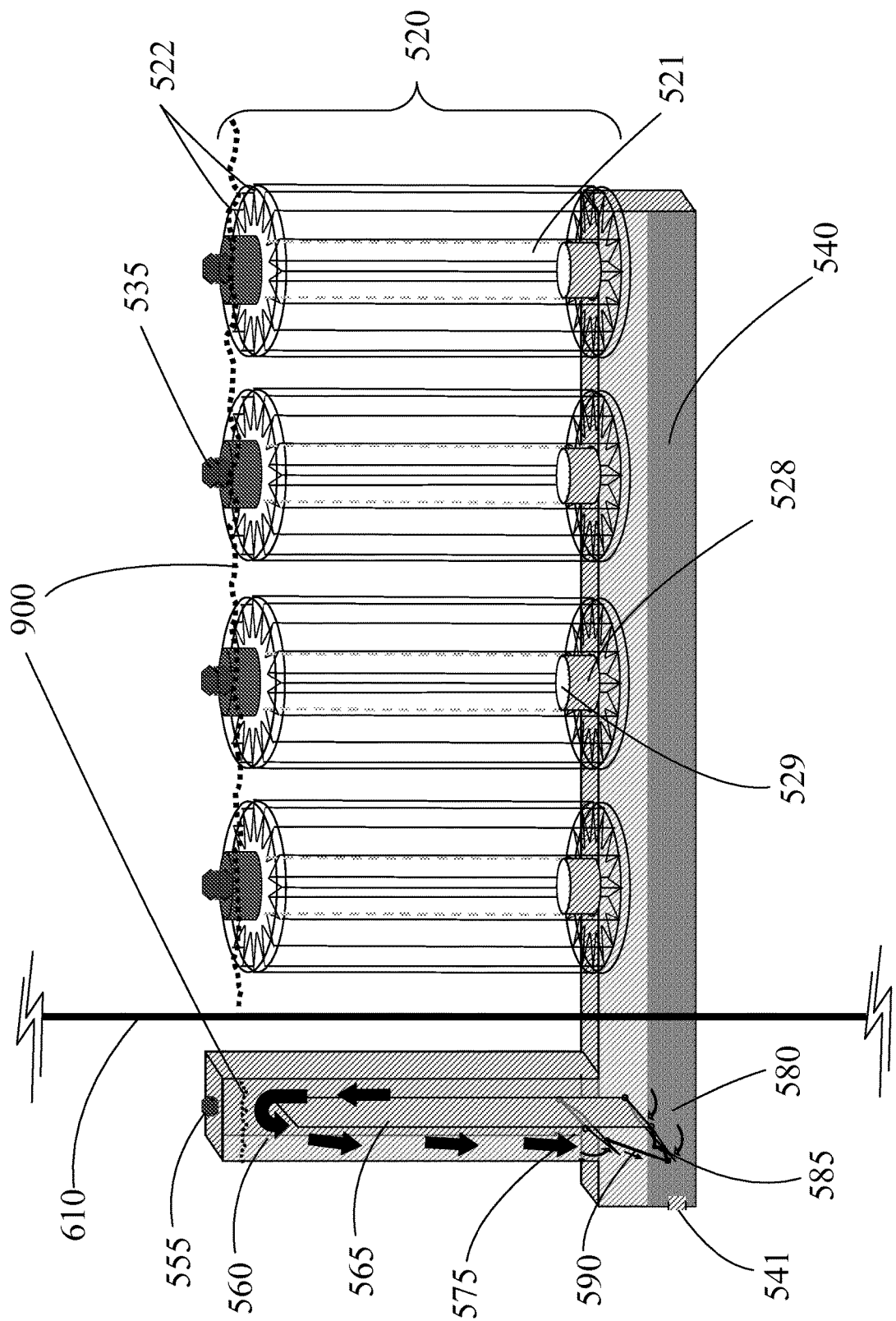
FIG. 9. Isolation view of a collection rail of the invention fitted with an outflow assembly that possesses a mechanical gate in an open configuration.
Figure 10:
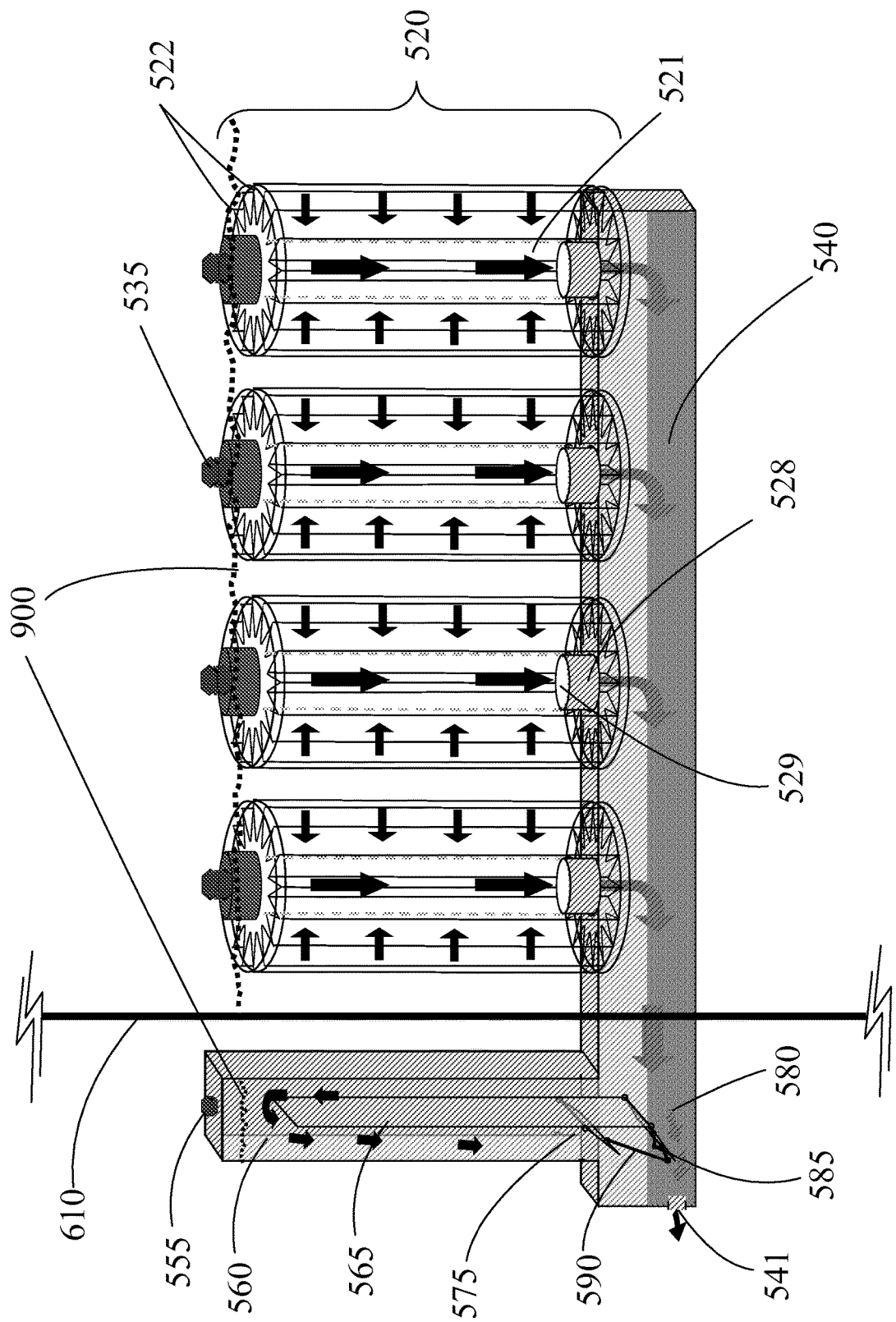
FIG. 10. Isolation view of a collection rail of the invention fitted with an outflow assembly that possesses a mechanical gate in an open configuration.

FIGS. 9 and 10 show the mechanical gate of flow control assembly 560 of FIG. 8 in an open configuration. The water-flow schematic arrows in FIGS. 9 and 10 indicate that, when water level 900 occupies a position above the top of gate weir 565, water flows over the top thereof and falls onto release flap 575. The pressure exerted by water falling on release flap 575 causes cam lock connector rod 590 to exert an amount of downward pressure on cam lock 585 effective to release it, which allows water pressure exerted on gate 580 to cause it to rotate into an open position. When gate 580 is in an open position, water flows through vertical filtration units 520 into collection rails 540, and underneath gate 580. Alternative types of gates within the scope of the invention include float gates, float valves, pressure gates, floating weirs, slide gates, tilt weirs, and lift gates.

Figure 13:
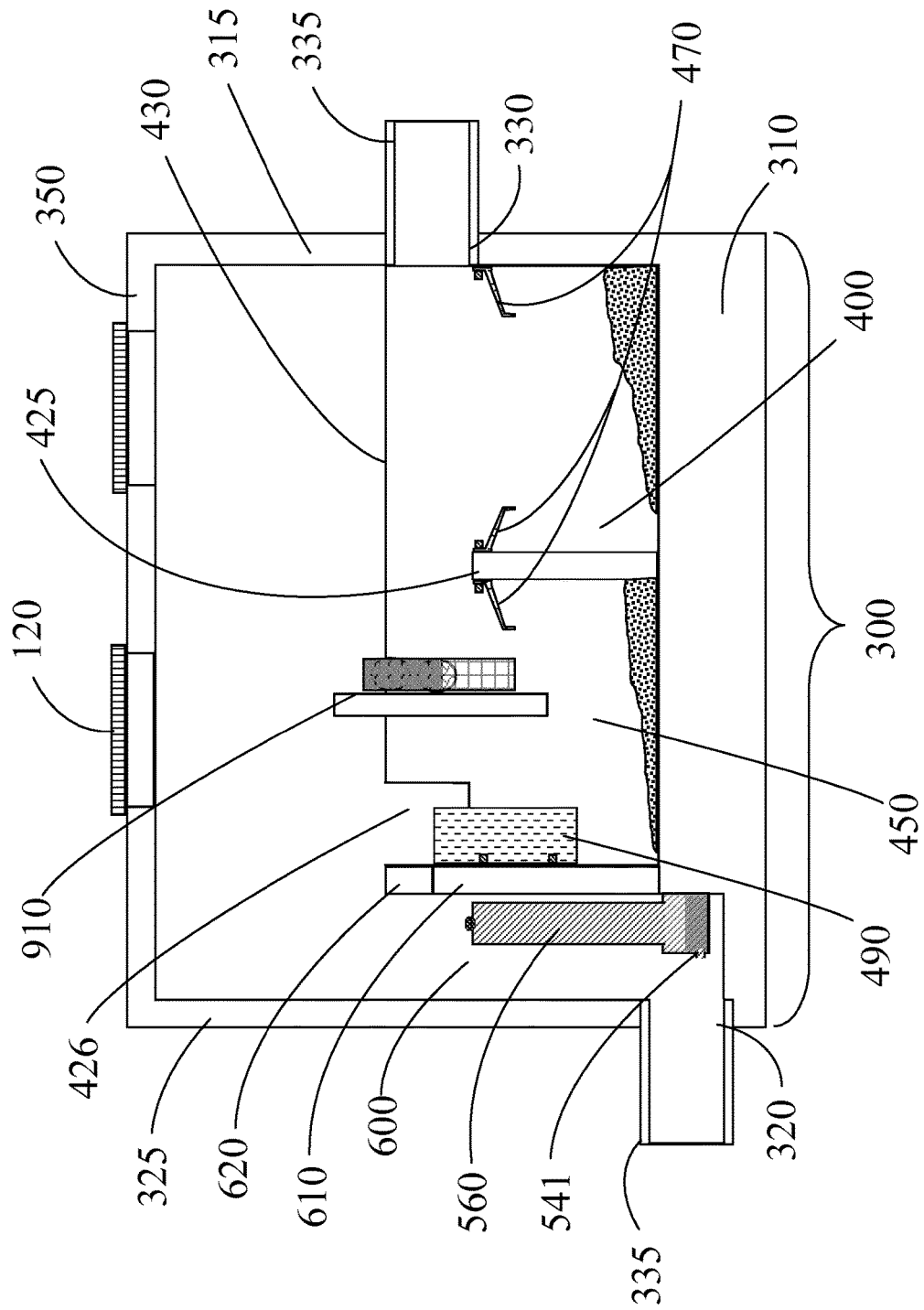
FIG. 13. Side-view of an embodiment of the invention that comprises an oil skimmer.

FIG. 13 shows a cut-out, side view of an embodiment of a partitioned water treatment system with vertical filtration units that differs from the embodiment illustrated in FIGS. 1-5 by possessing an oil skimmer 910, operative to absorb hydrocarbons from water for later removal, mounted in secondary separation chamber 450.

Figure 14:
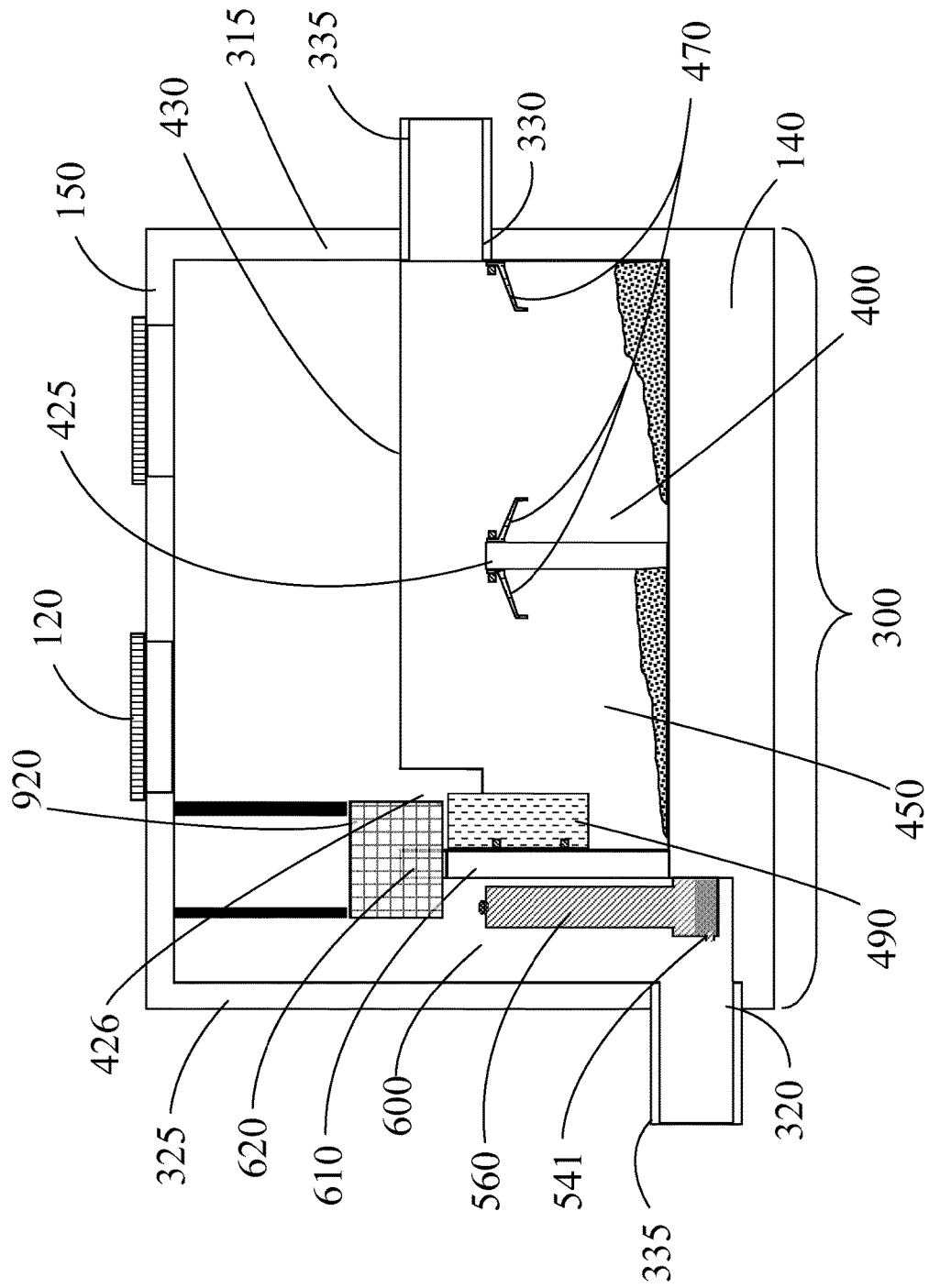
FIG. 14. Side-view, cut-out of an embodiment of the invention that comprises a bypass filtration basket.

FIG. 14 shows a cut-out, side view of an embodiment of a partitioned water treatment system with vertical filtration units that differs from the embodiment illustrated in FIGS. 1-5 by possessing a bypass filtration basket 920 mounted on discharge chamber wall 610 in discharge chamber 600.

Figure 15:
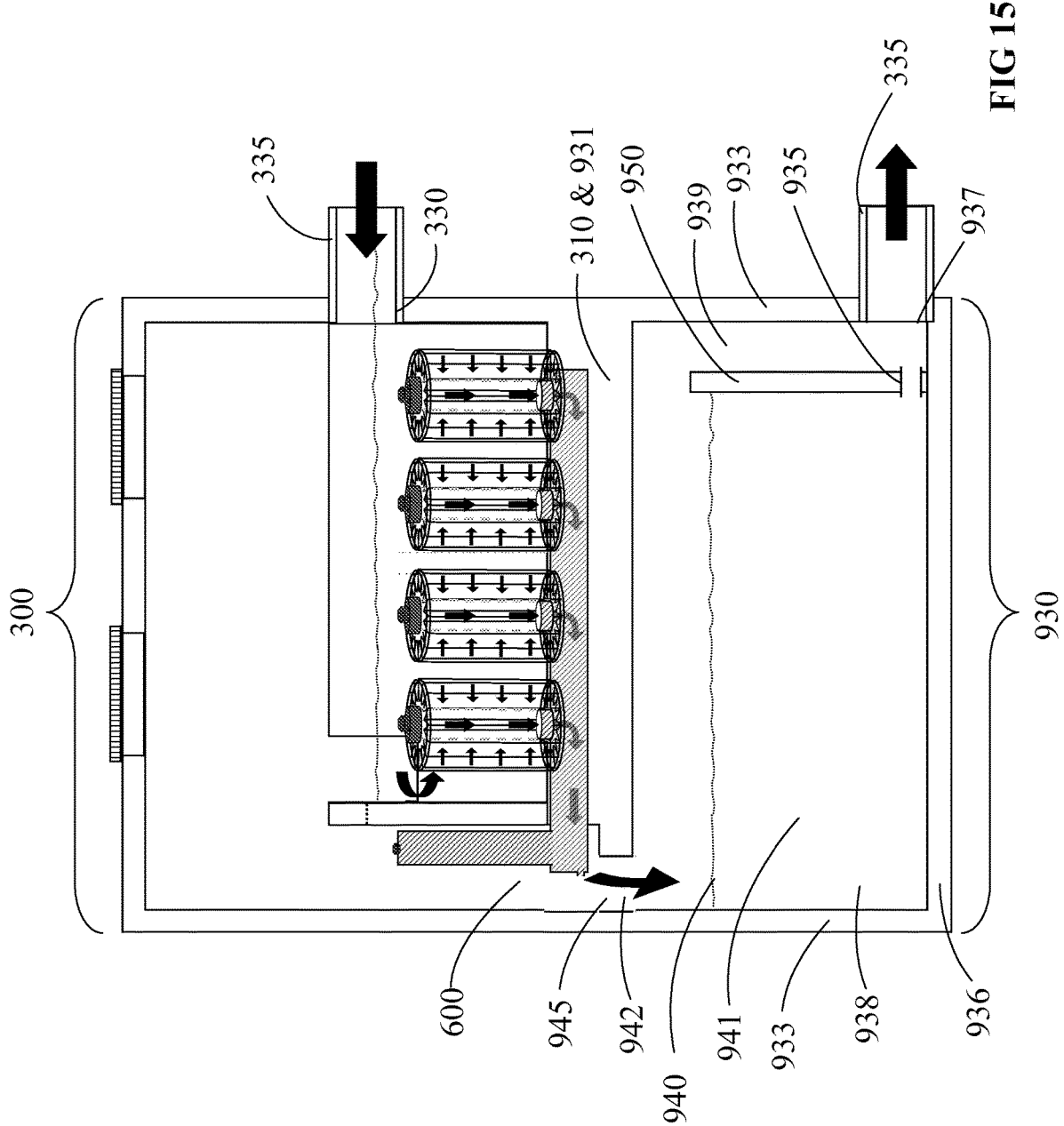
FIG. 15. Side-view, cut-out of an embodiment of the invention upstream of a water storage unit.
Figure 16:
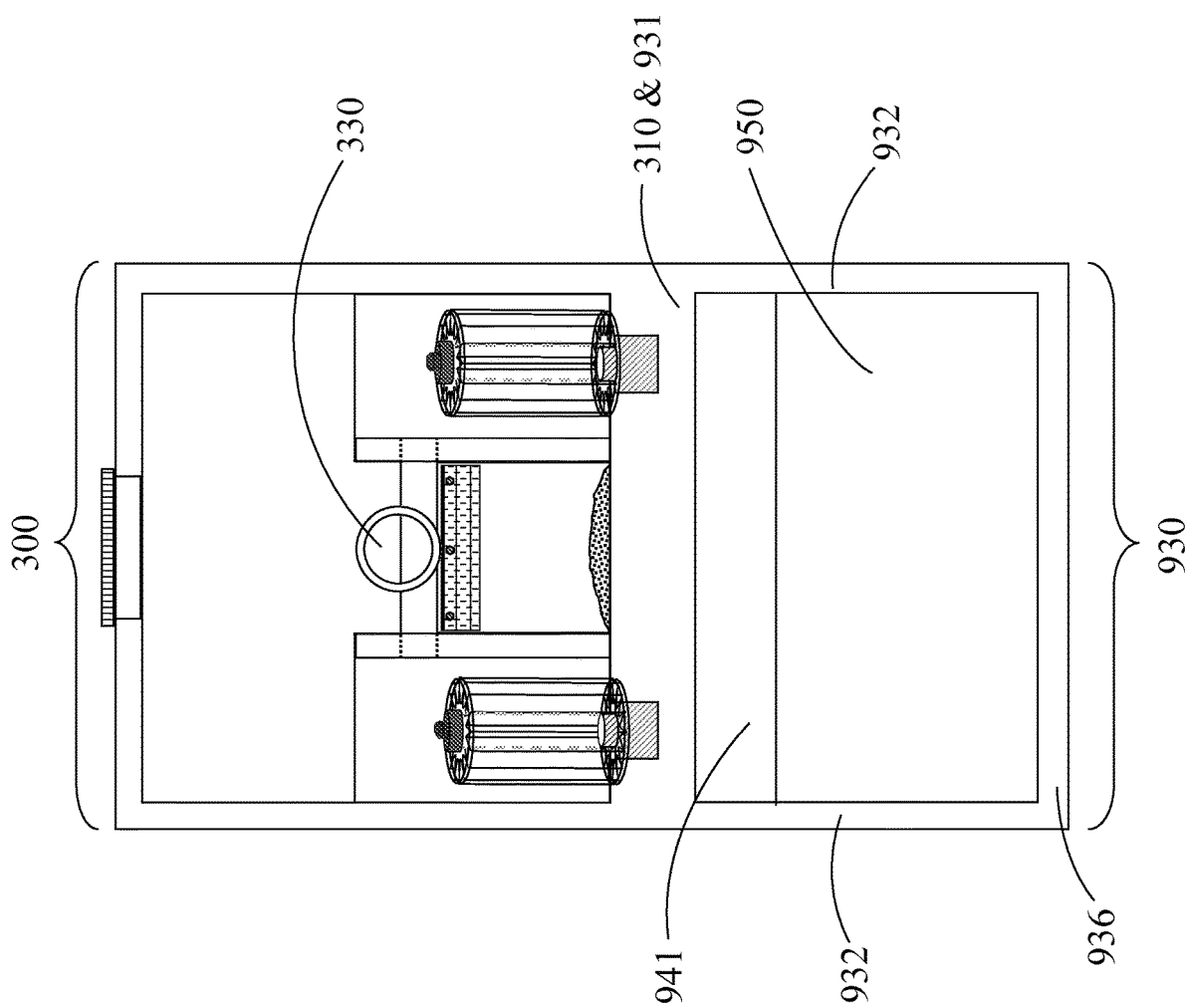
FIG. 16. End-view, cut-out of an embodiment of the invention upstream of a water storage unit FIG. 17. Side-view, cut-out of an embodiment of the invention downstream of a water storage unit.
Figure 17:
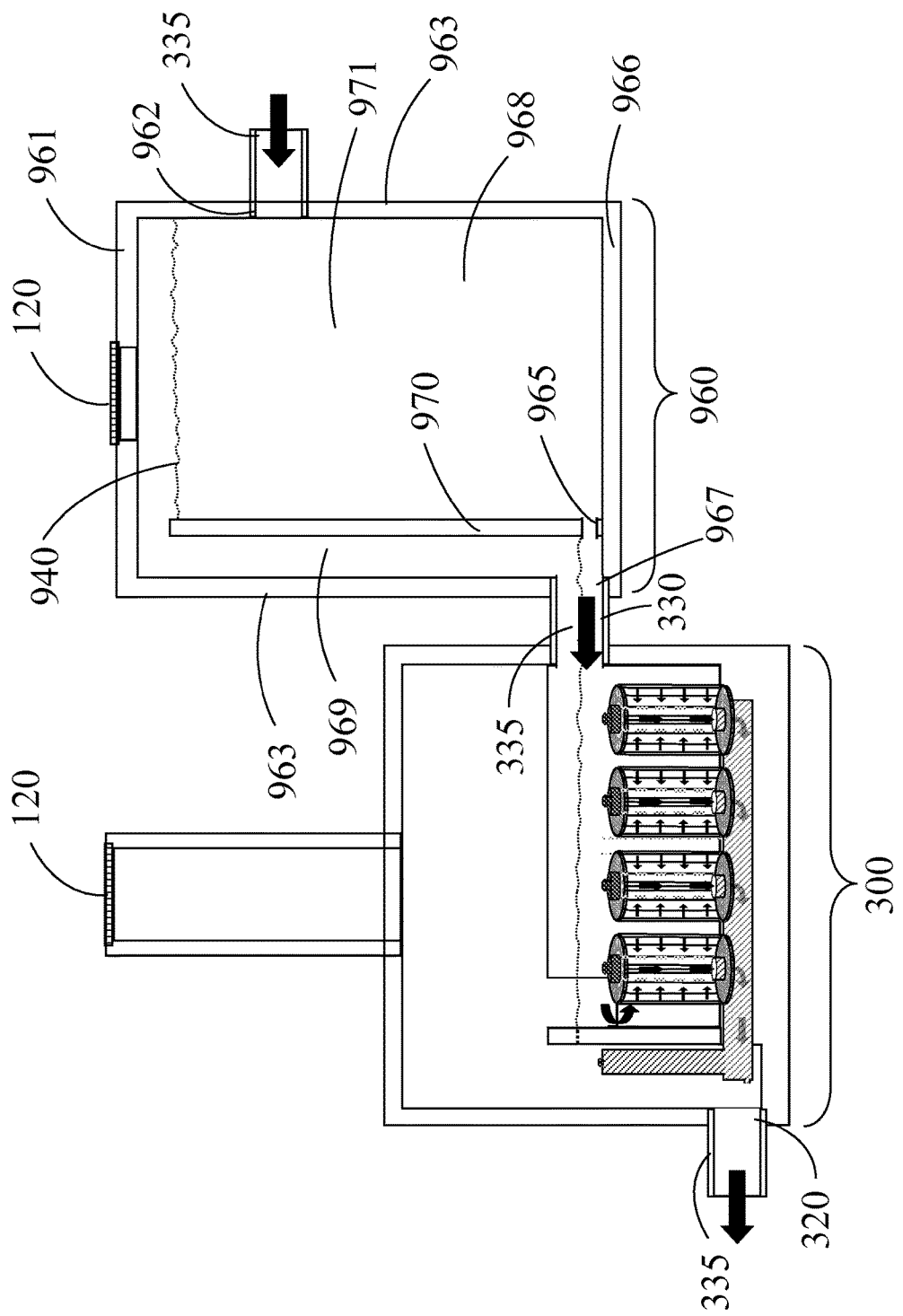
Figure 18:
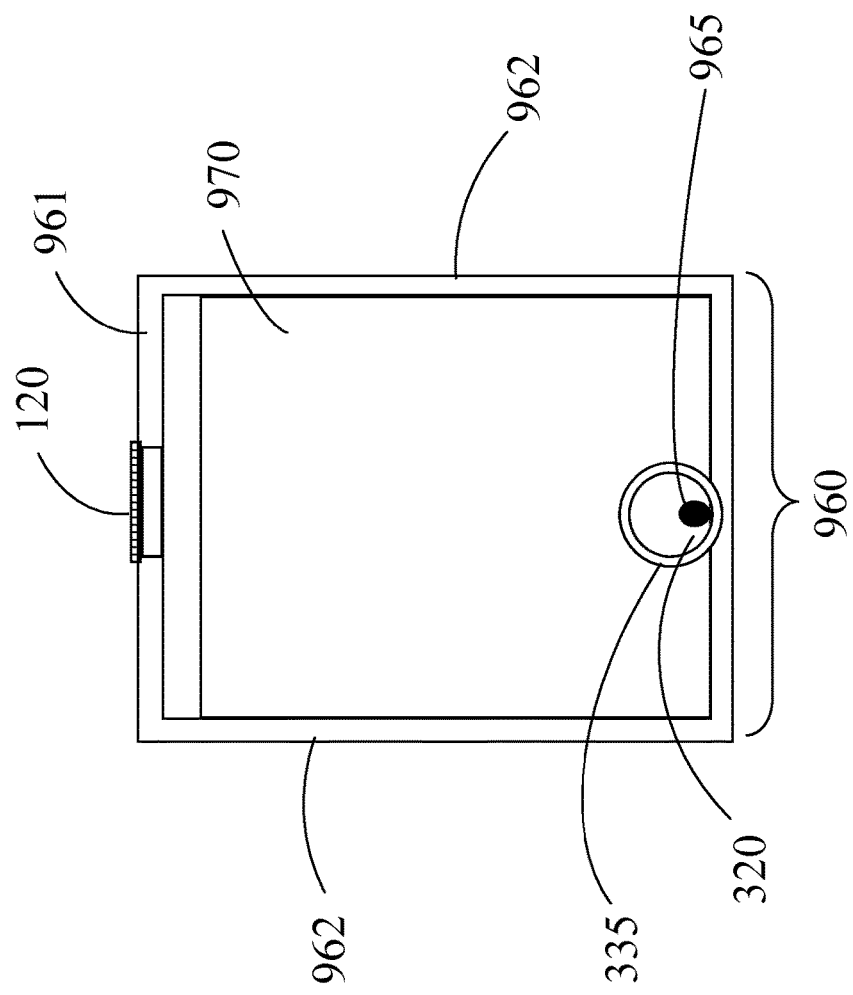
FIG. 18. End-view, cut-out of a water storage unit downstream of an embodiment of the invention.

FIG. 15 shows a cut-out, side view of an embodiment of a partitioned water treatment system with vertical filtration units installed upstream of water storage unit 930. The illustrated partitioned water treatment system with vertical filtration units differs from the embodiment illustrated in FIGS. 1-5 by lacking an outflow opening in endwall 325 possessing outflow opening 945 in floor 310 in discharge chamber 600. Outflow opening 945 allows water in discharge chamber 600 to flow into water storage unit 930. Water storage unit 930 comprises: i. roof 931, two side walls 932 (FIG. 16), two endwalls 933 (FIG. 15), deck 936, which form storage chamber 941, ii. influent opening 942 and effluent opening 937 abutting deck 936, and iii. storage chamber wall 950. Storage chamber wall 950 partitions water storage unit 930 into water storage chamber 941 and into inflow chamber 938 and discharge chamber 939. Storage chamber wall 950 is in sealed connection with side walls 932, but not roof 931 and comprises water storage chamber flow control orifice 935 in proximity with floor 936. This configuration results in water flowing, under conditions of low to moderate water flow through the water storage unit, from inflow chamber 938, through water chamber flow control orifice 935, into discharge chamber 939, through outflow opening 937, and into pipe 335, at a rate controlled by the size of storage chamber flow control orifice 935. Under such conditions, the water level 940 in storage chamber 930 remains below the top of storage chamber weir wall 950. Under conditions of high water flow through the system (not shown), water levels in the storage chamber rise to a level above the top of the storage chamber weir wall, such that water also flows from inflow chamber 938, over the top of separation chamber wall 950, into discharge chamber 939, through outflow opening 937, and into pipe 335. FIG. 17 shows a cut-out, side view of the partitioned water treatment system with vertical filtration units illustrated in FIGS. 1-5 installed downstream of water storage unit 960. Water storage unit 960 comprises: i.

roof 961, two side walls 962 (FIG. 18), two endwalls 963 (FIG. 17), deck 966, which form storage chamber 971, ii. influent opening 962 and effluent opening 967 abutting deck 966, and iii. storage chamber wall 970. Storage chamber wall 970 partitions water storage chamber 971 into inflow chamber 968 and discharge chamber 969. Storage chamber wall 970 is in sealed connection with side walls 962, but not roof 961 and comprises water storage chamber flow control orifice 965 in proximity with deck 966. This configuration results in water flowing, under conditions of low to moderate water flow through the water storage unit, from inflow chamber 968, through water chamber flow control orifice 965, into discharge chamber 969, through outflow opening 967, and into pipe 335, at a rate controlled by the size of storage chamber flow control orifice 965. Under such conditions, the water level 940 in storage chamber 930 remains below the top of storage chamber wall 970. Under conditions of high water flow through the system (not shown), water levels in the storage chamber rise to a level above the top of the storage chamber wall 970, such that water also flows from inflow chamber 938, over the top of storage chamber wall 970, into discharge chamber 969, through outflow opening 967, and into pipe 335.

Partitioned water treatment system with vertical filtration units according to the invention con be configured for installation upstream or downstream of a plurality of water storage units. In some embodiments, the partitioned water treatment system adjoins one or more water storage units. In some embodiments, the partitioned water treatment system and water storage unit are connected by pipe(s).

Figure 19:
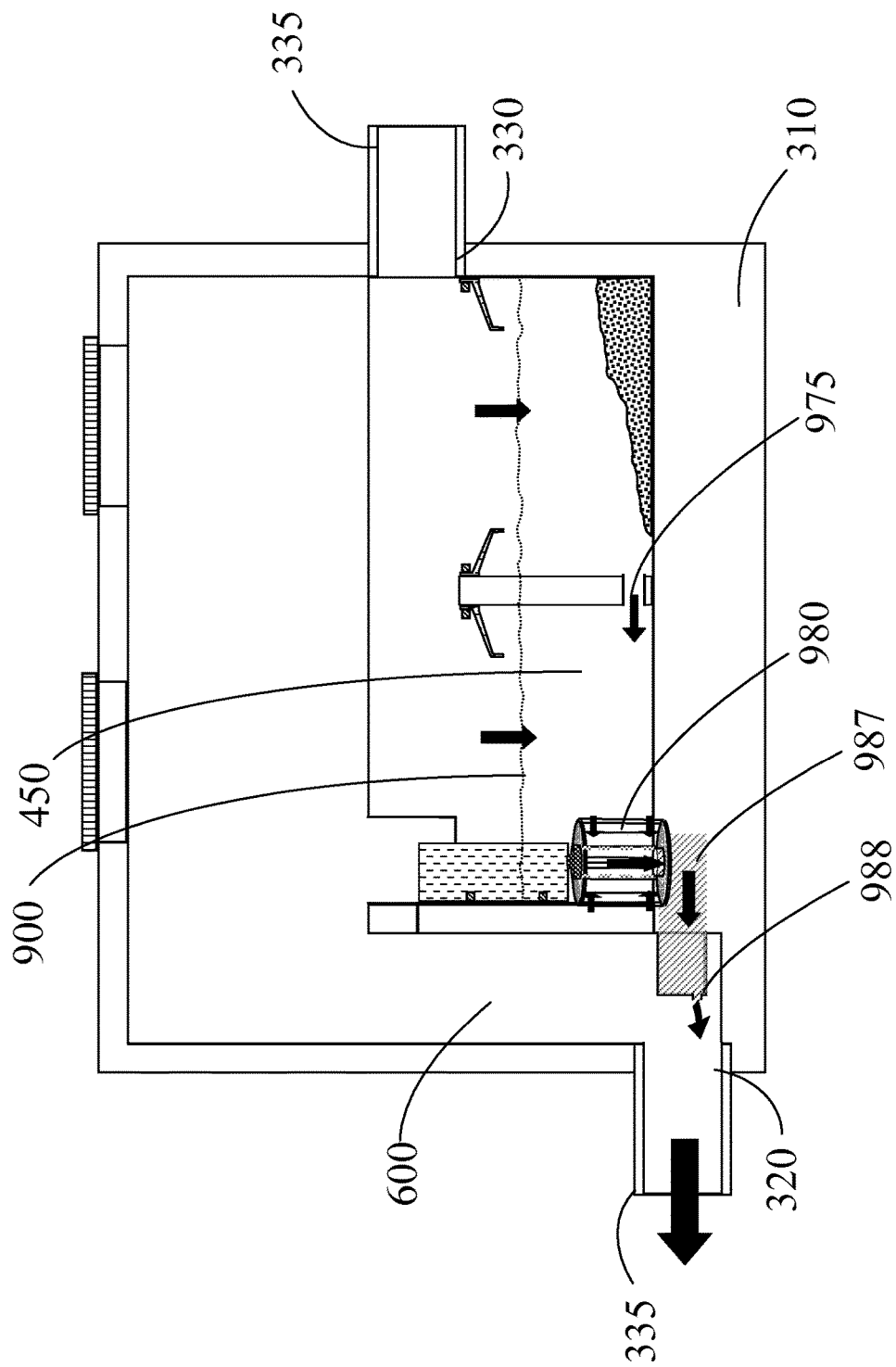
FIG. 19. Side-view, cut-out of an embodiment of the invention that comprises a drain-down filter.

FIG. 19 shows a side-view of an embodiment of a partitioned water treatment system of the invention, cut-out along dashed line A of FIG. 1. The embodiment illustrated in FIG. 19 differs from the embodiment illustrated in FIGS. 1-5 by: i. lacking a flow control assembly, ii. comprising drain-down filter 980 installed in secondary separation chamber 450, and iii. comprising drain-down orifice 975 in separation chamber partition wall 425. Drain-down orifice 975 in separation chamber partition wall 425 permits water to flow from primary filtration chamber 400 into secondary filtration chamber 450.

Figure 20:
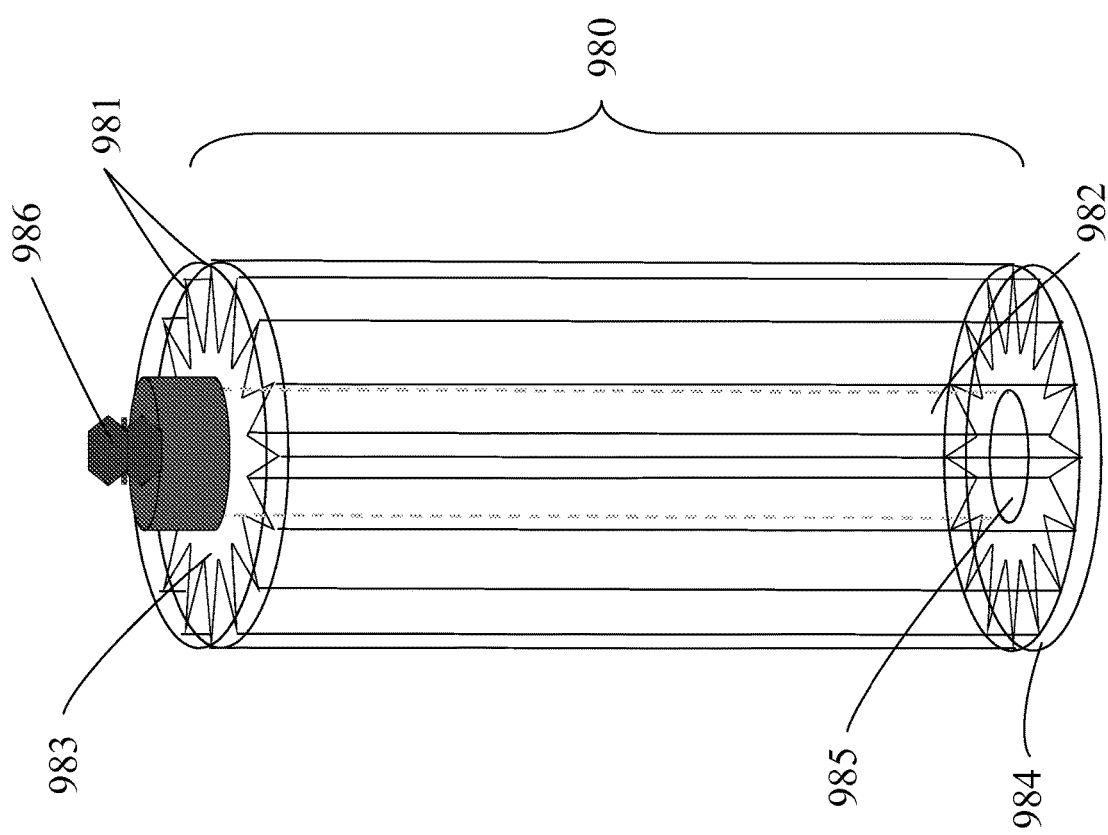
FIG. 20. Isolation view of an embodiment of a drain-down filtration unit of the invention.

As illustrated in FIG. 20, drain-down filter 980 comprises a sheet of filter material, such as porous plastic, paper, or fiberglass, folded back and forth into a series of pleats 981 formed into a hollow cylinder 982, the ends of which are sealed closed by water impermeable top end 983 and bottom end 984 that is only permeable to water through opening 985. Bottom end 984 and top end 983 are made from strong, durable material such as metal, plastic, or fiberglass. Top end of 983 of drain-down filter 980 also possesses handle 986. Referring again to FIG. 19, drain-down filter 980 is mounted on floor 310 and is in sealed, fluid communication with drain-down filter channel 987 in floor 310 that extends from secondary separation channel 450 to discharge chamber 600. Drain-down filter channel 987 is water impermeable apart from egress opening 988 in discharge chamber 600 and a drain-down filter opening (not seen) that is inline with bottom end opening 985 (FIG. 20). Drain-down filter 980 is operative to remove, from water flowing therethrough, waterborne particulate matter such as large and fine sediments and debris. Drain-down filter 980 and drain-down filter channel 987 together permit filtered water to flow from secondary filtration chamber 450 into discharge chamber 600. Drain-down orifice 975, drain-down filter 980, and drain-down filter channel 987 together are operative to establish a flow path of water through the partitioned water treatment system from primary separation chamber 400 through drain-down orifice 975 into secondary filtration chamber 450, through drain-down filter 980, through drain-down filter channel 987 into discharge chamber 600, and through outflow opening 320.

Figure 21:
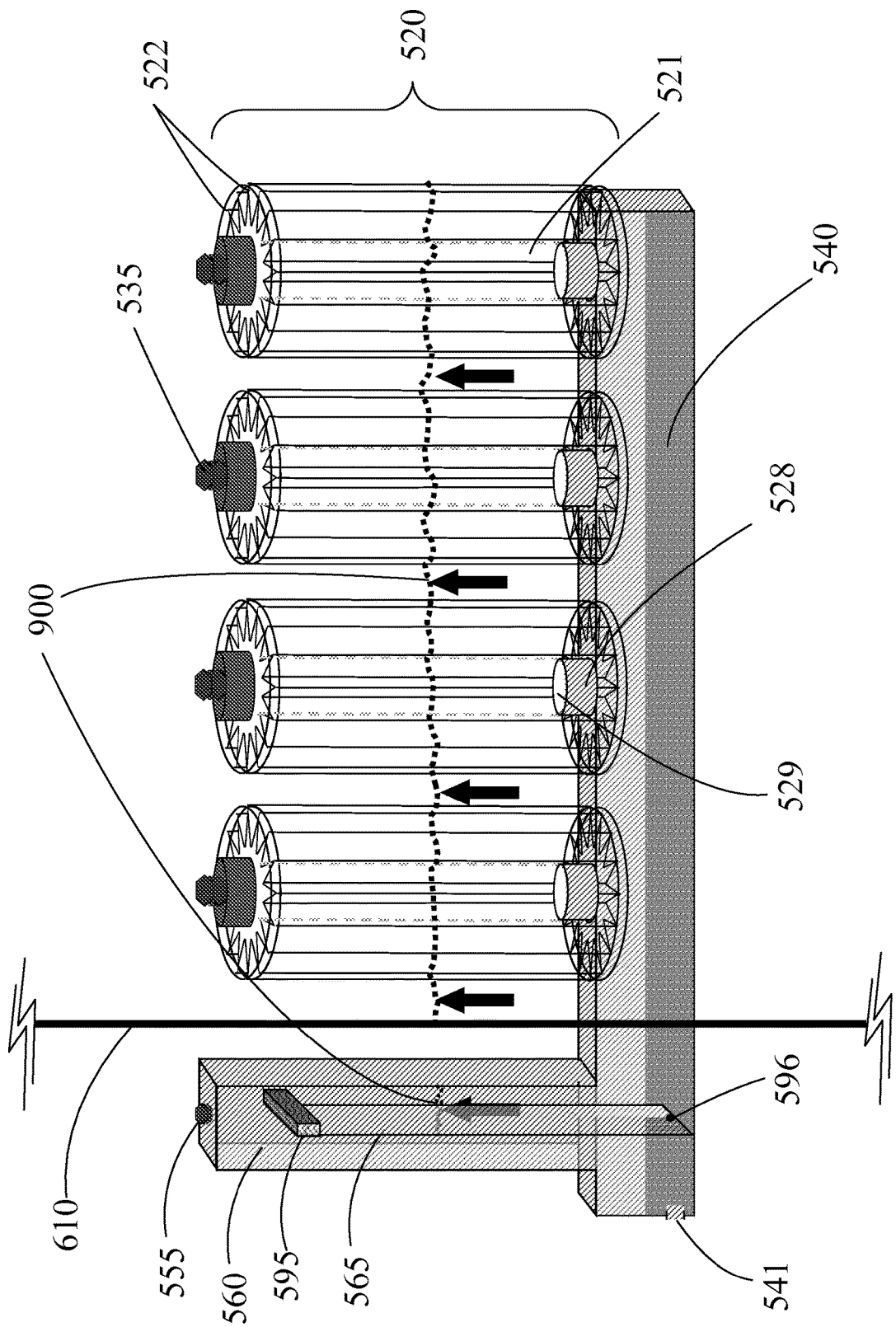
FIG. 21. Isolation view of a collection rail of the invention fitted with an outflow assembly that possesses a float gate in a closed configuration.
Figure 22:
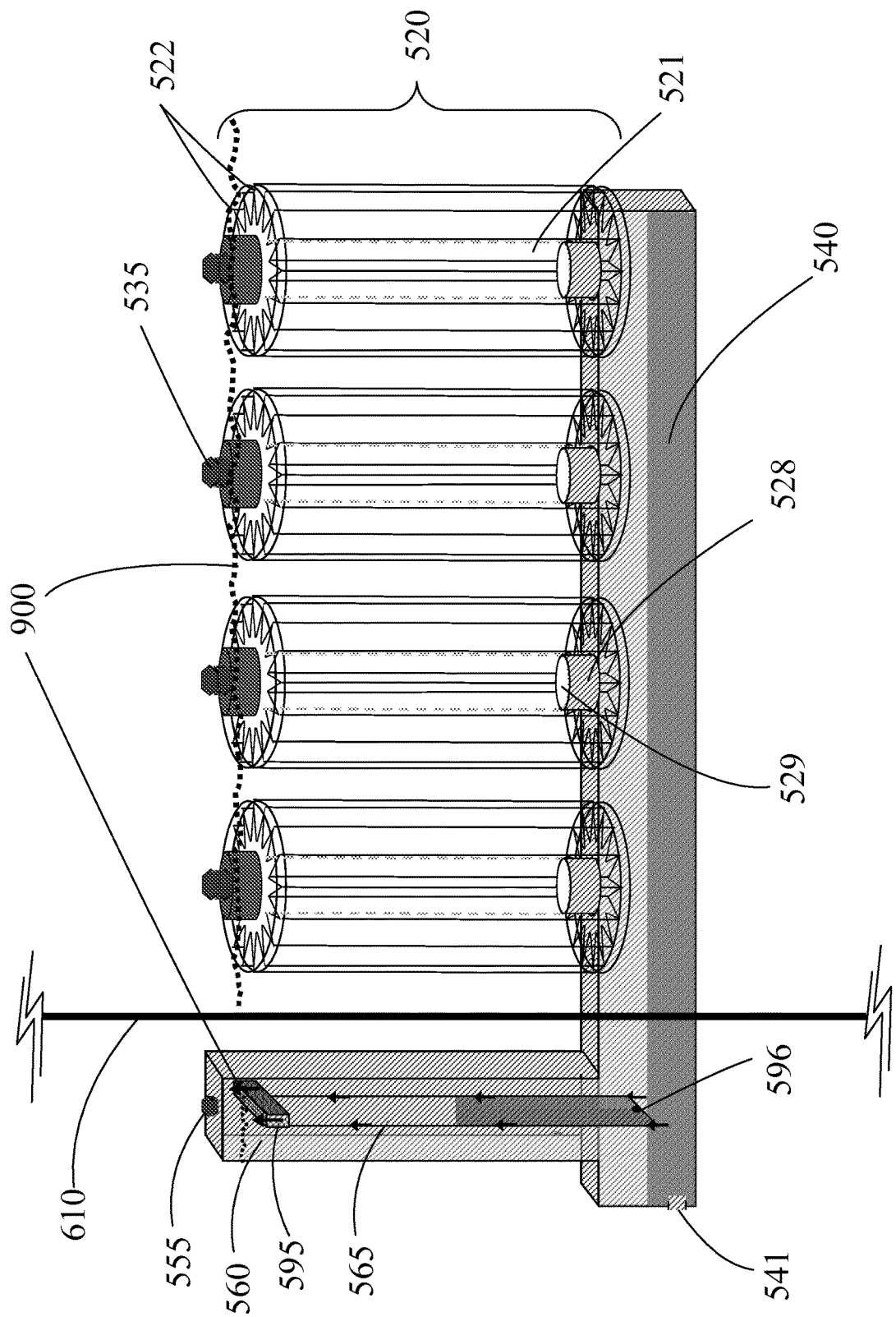
FIG. 22. Isolation view of a collection rail of the invention fitted with an outflow assembly that possesses a float gate in an open configuration.
Figure 23:
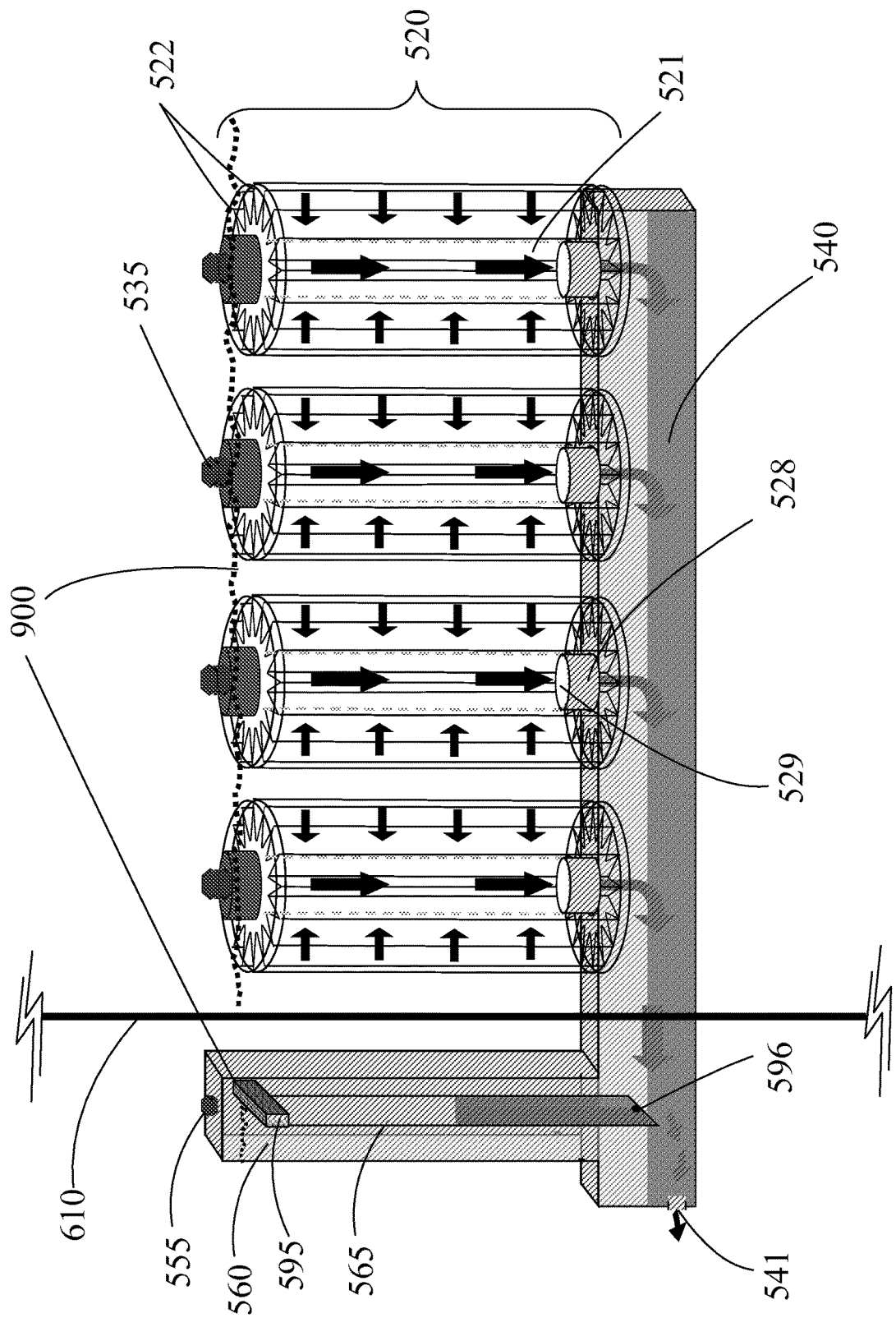
FIG. 23. Isolation view of a collection rail of the invention fitted with an outflow assembly that possesses a float gate in an open configuration.

FIG. 21 is an isolation view of an embodiment of a collection rail 540 that is inside a partitioned water filtration system and is fitted with a flow control assembly 560 that possesses an air release valve 555 and a float gate in a closed configuration. Air release valve 555 is configured to release air from the interior of flow control assembly 560 upon air pressure therein building to a threshold release level of air release valve 555, and air release valve 555 is operational to promote laminar flow of water over the top of gate weir 565. Air release valves useful in flow control assemblies include one-way valves and two-way valves. The float gate is installed inside of flow control assembly 560 which possesses a hollow structure. Flow control assembly 560 is in sealed connection with collection rail 540 and is in fluid communication with collection rail 540. The float gate comprises gate weir 565, buoy 595, and drain down orifice 596. Float gate weir 565 is in substantially sealed connection with two lateral walls of flow control assembly 560, two lateral walls of collection rail 540, and the floor of collection rail 540, but not the ceiling of flow control assembly 560. Float gate weir 565 is vertically moveably mounted in flow control assembly 560. Float gate buoy 595 is fixedly connected to float gate weir 565. Float gate buoy 595 and float gate weir 565 are configured to occupy a closed position when water level 900 occupies a position below buoy 595 in flow control assembly 560. When, as shown in FIG. 21, the float gate is in the closed configuration, float gate weir 565 impedes the flow of water out of collection rail 540, such that water enters filtration chamber 500 at a rate greater than it flows out of collection rail 540, causing water level 900 therein and in flow control assembly 560 to rise, as indicated by the water-flow schematic arrows FIGS. 22 and 23 show the float gate of flow control assembly 560 of FIG. 21 in an open configuration. The water-flow schematic arrows in FIGS. 22 and 23 indicate that, when water level 900 occupies a position near the top of float gate buoy 595, float gate buoy 595 lifts float gate weir 565 into an open configuration, which allows water to flow through vertical filtration units 520 into collection rails 540, underneath float gate weir 565 and through exit orifice 541.

In some embodiments, partitioned water treatment systems with vertical filtration units according to the invention do not possess a separation chamber partition wall; and therefore possess a primary separation chamber, but no secondary separation chamber. In such embodiments, a drain-down filter can be installed in the primary separation chamber. In some embodiments, partitioned water treatment systems with vertical filtration units according to the invention possess two separation chamber partition walls; and therefore possess at least a primary separation chamber, a secondary separation chamber, and a tertiary separation chamber. Partitioned water treatment systems with vertical filtration units according to the invention can possess any number of separation chamber partition walls needed to obtain a desired number of separation chambers, such as four, five, six, seven, eight, nine, and ten.

In some embodiments, partitioned water treatment systems with vertical filtration units according to the invention possess only one wall, which is a discharge chamber wall, and are therefore composed of two chambers, a filtration chamber and a discharge chamber.

In some embodiments, partitioned water treatment systems with vertical filtration units according to the invention possess one separation chamber wall and therefore possess one filtration chamber. In such embodiments that further comprise one or more separation chamber partition wall(s), the one or more separation chamber partition walls are in sealing contact with the one separation chamber wall, the floor, and one lateral wall of the box of the system, but not the ceiling of the box.

In some embodiments, partitioned water treatment systems with vertical filtration units according to the invention possess on or more access hatches in one or more of the inflow endwall, the outflow endwall, and the ceiling of the box comprising the system.

In some embodiments, partitioned water treatment systems with vertical filtration units according to the invention lack a flow control assembly.

In some embodiments, partitioned water treatment systems with vertical filtration units according to the invention lack or possess one diversion weir(s), bypass weir(s), or a combination thereof.

In some embodiments, vertical filtration units are, for facile cleaning and replacement, removeably mountable onto a collection rail by, for instance, coupler hardware such as friction fittings, threaded fittings, bolts, screws, nails, clamps, and the like. In some embodiments, vertical filtration units are permanently mounted onto a collection rail by, for instance, welding.

In some embodiments, vertical filtration units comprise rigid housings made of durable material such as metal, plastic, or fiberglass loaded with filtration material (e.g., as fiberglass, glass wool, and steel wool) or inorganic filtration media (e.g., zeolite, expanded aggregate, lava rock, oxide-coated inert material, alumina, pumice, and other similar oxides). Such inorganic filtration material and media is operative to remove not only large and fine sediment and debris but also dissolved pollutants from water. In such embodiments, the housings possess screened or grated openings that permit water to pass through the filtration unit and retain the filtration material or media within the housing. In some embodiments, vertical filtration units are permanently attached to the collection rails of a partitioned water treatment system. In some embodiments, vertical filtration units can be equipped with lids or hatches to that provide access to the filtration material or media for removal or cleaning.

The apparatus and methods described are the preferred and alternate embodiments of this invention, but other methods are possible and are within the contemplation of this patent.

What is claimed is:

1. A partitioned water treatment system comprised of a box configured for installation into a flow stream of surface runoff water conveyance infrastructure (SRWC infrastructure), the box possessing a ceiling, a floor, walls, an inflow opening, an outflow opening, a separation chamber with walls, a discharge chamber wall, and one or more collection rail(s), wherein:
   the discharge chamber wall is in sealed connection with the floor and the walls, including one or more lateral walls and one or more endwalls, but not the ceiling, such that the discharge chamber wall partitions the box into a filtration chamber that abuts the inflow opening, and a discharge chamber that abuts the outflow opening,
   the inflow opening is: i. positioned in the ceiling, one of the two lateral walls, or one of the two endwalls; and ii. configured for achieving sealed, fluid communication with SRWC infrastructure upstream of the partitioned water treatment system,
   the outflow opening: i. positioned in the floor or in proximity with the floor in one of the two lateral walls or one of the two endwalls; and ii. configured for achieving sealed, fluid communication with the SRWC infrastructure downstream of the partitioned water treatment system, each of the one or more collection rail(s) comprises: i. a duct that extends from the discharge chamber to the filtration chamber, sealingly through the discharge chamber wall, and ii. one or more filter assemblage(s):

the one or more filter assemblage(s) comprising a vertical filter, a filter opening in the duct, and a coupler that mounts the vertical filter on the duct and places the vertical filter and the filter opening in sealed, fluid communication, wherein the separation chamber is partitioned into a primary and secondary separation chamber by a partition wall which is configured to allow water entering the inflow opening to flow into the primary separation chamber, over separation chamber partition wall, into secondary separation chamber and in the process settling out sufficiently dense and heavy waterborne sediment and debris, wherein the vertical filter of at least one of the one or more filter assemblage(s) comprises a sheet of filter material formed into a cylinder closed by a top end that is water impermeable and a bottom end that is water impermeable a part from an opening through which water can flow, and wherein the coupler is adapted to place the opening in the bottom end of the vertical filter in sealed, fluid communication with the filter opening of the at least one of the one or more filter assemblage(s);

wherein the sheet of filter material is selected from the group consisting of plastic, paper, fiberglass, or a combination thereof;

wherein the sheet of filter material comprises back and forth folds that form a series of pleats;

wherein the coupler of at least one of the one or more filter assemblage(s) is adapted to removeably mount the vertical filter on the duct;

the duct comprising an exit opening in the discharge chamber and configured such that: i. each of the one or more filter assemblage(s) are positioned in the filtration chamber, and ii. the duct is water impermeable a part from the exit opening and the filter opening(s) of each of the one or more filter assemblage(s), and the collection rail is operative to allow water to flow from the filtration chamber to the discharge chamber by passing through at least one of the one or more filter assemblage(s), the duct, and the exit opening, further comprising a drain-down filter assembly installed in a said secondary separation chamber comprising a drain-down filter and a drain-down filter channel that exits in the discharge chamber;

the top of the discharge chamber wall is positioned in the box such that in conditions of:

low to moderate water flow through the system, a flow path of water is from the inflow opening into the separation chamber, over the separation chamber wall into the filtration chamber, through at least one of the one or more collection rail(s) into the discharge chamber, and through the outflow.

2. The partitioned water treatment system of claim 1, further comprising a drain-down orifice in the separation chamber partition wall.

3. The partitioned water treatment system of claim 1, wherein the ends of the drain-down filter are sealed closed by a water impermeable top end and bottom end that is only permeable to water through an opening;

wherein the drain-down filter is mounted on a floor and is in sealed, fluid communication with a drain-down filter channel in a floor that extends from secondary separation channel to discharge chamber; and wherein the drain-down filter channel is water impermeable apart from egress opening in a discharge chamber and a drain-down filter opening that is inline with a bottom end opening; and wherein the top end of the drain-down filter possesses a handle.

4. The partitioned water treatment system of claim 1, wherein the drain-down filter comprises a sheet of filter material selected from a group consisting of: porous plastic, paper, or fiberglass or a combination thereof, folded back and forth into a series of pleats forming a hollow cylinder; and wherein a bottom end of the drain-down filter and a top end of the drain-down filter are made from strong, durable material selected from the group consisting of metal, plastic, and fiberglass.

* * * * *